US008306912B2

(12) United States Patent
Galit

(10) Patent No.: US 8,306,912 B2
(45) Date of Patent: Nov. 6, 2012

(54) PRIVATE LABEL PROMOTION CARD SYSTEM, PROGRAM PRODUCT, AND ASSOCIATED COMPUTER-IMPLEMENTED METHODS

(75) Inventor: Scott Galit, New York, NY (US)

(73) Assignee: Metabank, Sioux Falls, SD (US)

( * ) Notice: Subject to any disclaimer, the term of this patent is extended or adjusted under 35 U.S.C. 154(b) by 648 days.

(21) Appl. No.: 12/338,497

(22) Filed: Dec. 18, 2008

(65) Prior Publication Data

US 2009/0164368 A1 Jun. 25, 2009

Related U.S. Application Data

(60) Provisional application No. 61/014,950, filed on Dec. 19, 2007.

(51) Int. Cl.
*G06Q 40/00* (2012.01)
(52) U.S. Cl. ............................................. 705/40; 705/39
(58) Field of Classification Search ............... 705/35–45
See application file for complete search history.

(56) References Cited

U.S. PATENT DOCUMENTS

| | | | |
|---|---|---|---|
| 3,752,904 A | 8/1973 | Waterbury |
| 4,247,759 A | 1/1981 | Yuris et al. |
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzaff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Saver |
| 4,750,201 A | 6/1988 | Hodgson et al. |
| 4,797,540 A | 1/1989 | Kimizu |

(Continued)

FOREIGN PATENT DOCUMENTS

EP 0397512 A2 11/1990

(Continued)

OTHER PUBLICATIONS

Microtrax Ltd., PC Electronic Payment Systems Reference Manual; 1995 (381 pages).

(Continued)

*Primary Examiner* — Charles Kyle
*Assistant Examiner* — Jennifer Liu
(74) *Attorney, Agent, or Firm* — Bracewell & Giuliani, LLP

(57) ABSTRACT

Embodiments of the present invention provide a private label promotion card as a bank product, being issued and managed by the bank and using an open payment network for purchase authorization and payments. A bank computer processes activation information for a promotion card and receives finds into an account at the bank on behalf of a retailer for payment for the promotion card, perhaps at a discount to a customer value of the promotion card. The bank computer authorizes purchase requests to use one or more activated promotion cards as payment for a consumer purchase from the retailer via an open payment network and transfers funds to the open payment network to satisfy the authorized consumer purchase. Upon expiration, the bank computer sweeps the account of the remaining value for expired promotion cards to thereby establish a credit for the bank.

20 Claims, 8 Drawing Sheets

U.S. PATENT DOCUMENTS

| | | | |
|---|---|---|---|
| 4,827,113 A | 5/1989 | Rikuna | |
| 4,868,900 A | 9/1989 | McGuire | |
| 4,877,947 A | 10/1989 | Mori | |
| 4,879,744 A | 11/1989 | Tasaki et al. | |
| 4,884,212 A | 11/1989 | Stutsman | |
| 4,951,308 A | 8/1990 | Bishop et al. | |
| 4,968,873 A | 11/1990 | Dethloff et al. | |
| 5,012,077 A | 4/1991 | Takano | |
| 5,048,085 A | 9/1991 | Abraham et al. | |
| 5,050,207 A | 9/1991 | Hitchcock | |
| 5,068,891 A | 11/1991 | Marshall | |
| 5,101,098 A | 3/1992 | Naito | |
| 5,138,650 A | 8/1992 | Stahl et al. | |
| 5,146,067 A | 9/1992 | Sloan et al. | |
| 5,148,481 A | 9/1992 | Abraham et al. | |
| 5,155,342 A | 10/1992 | Urano | |
| 5,163,086 A | 11/1992 | Ahearn et al. | |
| 5,192,947 A | 3/1993 | Neustein | |
| 5,220,593 A | 6/1993 | Zicker et al. | |
| 5,221,838 A | 6/1993 | Gutman et al. | |
| 5,225,666 A | 7/1993 | Amarena et al. | |
| 5,264,689 A | 11/1993 | Maes et al. | |
| 5,265,155 A | 11/1993 | Castro | |
| 5,266,782 A | 11/1993 | Alanärä et al. | |
| 5,272,320 A | 12/1993 | Hakamada | |
| 5,278,752 A | 1/1994 | Narita et al. | |
| 5,285,382 A | 2/1994 | Muehlberger et al. | |
| 5,327,482 A | 7/1994 | Yamamoto | |
| 5,334,821 A | 8/1994 | Campo et al. | |
| 5,340,969 A | 8/1994 | Cox | |
| 5,352,876 A | 10/1994 | Watanabe et al. | |
| 5,359,182 A | 10/1994 | Schilling | |
| 5,409,092 A | 4/1995 | Itako et al. | |
| 5,416,306 A | 5/1995 | Imahata | |
| 5,438,186 A | 8/1995 | Nair et al. | |
| 5,442,567 A | 8/1995 | Small | |
| 5,448,044 A | 9/1995 | Price et al. | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,550,358 A | 8/1996 | Tait et al. | |
| 5,577,109 A | 11/1996 | Stimson et al. | |
| 5,577,121 A | 11/1996 | Davis et al. | |
| 5,661,254 A | 8/1997 | Steuer et al. | |
| 5,696,908 A | 12/1997 | Muehlberger et al. | |
| 5,699,528 A | 12/1997 | Hogan | |
| 5,732,136 A | 3/1998 | Murphree et al. | |
| 5,814,798 A | 9/1998 | Zancho | |
| 5,841,365 A | 11/1998 | Rimkus | |
| 5,859,419 A | 1/1999 | Wynn | |
| 5,875,437 A | 2/1999 | Atkins | |
| 5,878,141 A | 3/1999 | Daly et al. | |
| 5,893,907 A * | 4/1999 | Ukuda | 705/35 |
| 5,897,620 A | 4/1999 | Walker et al. | |
| 5,920,848 A | 7/1999 | Schutzer et al. | |
| 5,923,016 A | 7/1999 | Fredregill et al. | |
| 5,933,812 A | 8/1999 | Meyer et al. | |
| 5,963,921 A | 10/1999 | Longfield | |
| 6,000,608 A * | 12/1999 | Dorf | 235/380 |
| 6,012,635 A | 1/2000 | Shimada et al. | |
| 6,021,397 A | 2/2000 | Jones et al. | |
| 6,032,859 A | 3/2000 | Muehlberger et al. | |
| 6,041,308 A | 3/2000 | Walker et al. | |
| 6,065,679 A | 5/2000 | Levie et al. | |
| 6,112,191 A | 8/2000 | Burke | |
| 6,144,948 A | 11/2000 | Walker et al. | |
| 6,154,738 A | 11/2000 | Call | |
| 6,189,787 B1 | 2/2001 | Dorf | |
| 6,208,978 B1 | 3/2001 | Walker et al. | |
| 6,249,773 B1 | 6/2001 | Allard et al. | |
| 6,253,998 B1 | 7/2001 | Ziamo | |
| 6,304,860 B1 | 10/2001 | Martin et al. | |
| 6,315,193 B1 | 11/2001 | Hogan | |
| 6,467,684 B2 | 10/2002 | Fite et al. | |
| 6,704,714 B1 | 3/2004 | O'Leary et al. | |
| 6,739,506 B1 | 5/2004 | Constantine | |
| 6,865,544 B1 | 3/2005 | Austin | |
| 6,999,943 B1 | 2/2006 | Johnson et al. | |
| 7,010,507 B1 | 3/2006 | Anderson et al. | |
| 7,031,939 B1 | 4/2006 | Gallagher et al. | |
| 7,072,862 B1 | 7/2006 | Wilson | |
| 7,127,452 B1 | 10/2006 | Yashiro | |
| 7,177,829 B1 | 2/2007 | Wilson et al. | |
| 7,206,761 B2 | 4/2007 | Colvin | |
| 7,252,223 B2 | 8/2007 | Schofield | |
| 7,258,273 B2 | 8/2007 | Griffin | |
| 7,370,076 B2 | 5/2008 | Friedman et al. | |
| 7,398,919 B2 | 7/2008 | Cooper | |
| 7,426,492 B1 | 9/2008 | Bishop et al. | |
| 7,451,920 B1 | 11/2008 | Rose | |
| 7,509,286 B1 | 3/2009 | Bent et al. | |
| 7,546,945 B1 | 6/2009 | Bucci et al. | |
| 7,567,936 B1 | 7/2009 | Peckover et al. | |
| 7,606,918 B2 | 10/2009 | Holzman et al. | |
| 7,607,570 B1 | 10/2009 | Constantine | |
| 7,628,319 B2 | 12/2009 | Brown et al. | |
| 7,653,591 B1 | 1/2010 | Dabney | |
| 7,702,583 B1 | 4/2010 | Hamilton et al. | |
| 7,702,587 B2 | 4/2010 | Nguyen et al. | |
| 7,757,944 B2 | 7/2010 | Cline et al. | |
| 7,783,571 B2 | 8/2010 | Fish et al. | |
| 7,792,717 B1 | 9/2010 | Hankins et al. | |
| 7,810,735 B2 | 10/2010 | Madani | |
| 7,813,955 B2 | 10/2010 | Ariff et al. | |
| 7,814,012 B2 | 10/2010 | Johnson | |
| 7,865,434 B2 | 1/2011 | Sheets | |
| 7,899,750 B1 | 3/2011 | Klieman et al. | |
| 7,904,333 B1 | 3/2011 | Perkowski | |
| 7,933,833 B2 | 4/2011 | Hotz et al. | |
| 7,954,704 B1 * | 6/2011 | Gephart et al. | 235/380 |
| 8,024,242 B2 | 9/2011 | Galit | |
| 8,046,256 B2 | 10/2011 | Chien et al. | |
| 8,051,006 B1 | 11/2011 | Rourk | |
| 8,055,557 B2 | 11/2011 | Sorbe et al. | |
| 8,065,187 B2 | 11/2011 | Ahlers et al. | |
| 8,069,085 B2 | 11/2011 | Ahlers et al. | |
| 8,086,494 B2 | 12/2011 | Dooley et al. | |
| 8,090,649 B2 | 1/2012 | Galit et al. | |
| 8,103,549 B1 | 1/2012 | Ahlers et al. | |
| 8,108,272 B2 | 1/2012 | Sorbe et al. | |
| 8,108,279 B2 | 1/2012 | Galit et al. | |
| 8,108,977 B1 | 2/2012 | Miller | |
| 8,150,764 B2 | 4/2012 | Crowe et al. | |
| 8,175,962 B2 | 5/2012 | Galit et al. | |
| 2001/0021925 A1 | 9/2001 | Ukigawa et al. | |
| 2001/0034676 A1 | 10/2001 | Vasic | |
| 2001/0042785 A1 | 11/2001 | Walker et al. | |
| 2002/0002075 A1 * | 1/2002 | Rowe | 463/25 |
| 2002/0032612 A1 | 3/2002 | Williams et al. | |
| 2002/0038285 A1 | 3/2002 | Golden et al. | |
| 2002/0042744 A1 | 4/2002 | Kohl | |
| 2002/0055904 A1 | 5/2002 | Mon | |
| 2002/0055909 A1 * | 5/2002 | Fung et al. | 705/42 |
| 2002/0077971 A1 | 6/2002 | Allred | |
| 2002/0107797 A1 | 8/2002 | Combaluzier | |
| 2002/0152161 A1 | 10/2002 | Aoike | |
| 2002/0194122 A1 | 12/2002 | Knox et al. | |
| 2002/0194124 A1 | 12/2002 | Hobbs et al. | |
| 2003/0004997 A1 | 1/2003 | Parker et al. | |
| 2003/0055782 A1 | 3/2003 | Slater | |
| 2003/0061170 A1 | 3/2003 | Uzo | |
| 2003/0074311 A1 | 4/2003 | Saylors et al. | |
| 2003/0097331 A1 | 5/2003 | Cohen | |
| 2003/0135459 A1 | 7/2003 | Abelman et al. | |
| 2003/0144935 A1 | 7/2003 | Sobek | |
| 2003/0158811 A1 | 8/2003 | Sanders et al. | |
| 2003/0167225 A1 | 9/2003 | Adams | |
| 2003/0191702 A1 | 10/2003 | Hurley | |
| 2003/0191714 A1 | 10/2003 | Norris | |
| 2003/0197059 A1 | 10/2003 | Tidball et al. | |
| 2003/0200118 A1 | 10/2003 | Lee et al. | |
| 2003/0208443 A1 | 11/2003 | Mersky | |
| 2003/0217003 A1 | 11/2003 | Weinflash et al. | |
| 2004/0036215 A1 | 2/2004 | Butler, II | |
| 2004/0047459 A1 | 3/2004 | Diaz | |
| 2004/0098351 A1 * | 5/2004 | Duke | 705/65 |

| Publication No. | Date | Name |
|---|---|---|
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0199463 A1 | 10/2004 | Deggendorf |
| 2004/0210484 A1 | 10/2004 | Lee |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1 | 11/2004 | Stronach et al. |
| 2004/0236646 A1 | 11/2004 | Wu et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0075939 A1 | 4/2005 | Bao et al. |
| 2005/0082364 A1 | 4/2005 | Alvarez et al. |
| 2005/0108121 A1 | 5/2005 | Gravett et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0203837 A1 | 9/2005 | Leigh et al. |
| 2005/0205663 A1 | 9/2005 | Algiene |
| 2005/0228724 A1 | 10/2005 | Frangiosa |
| 2005/0278188 A1 | 12/2005 | Thomson et al. |
| 2005/0278347 A1 | 12/2005 | Wolf et al. |
| 2006/0059085 A1 | 3/2006 | Tucker |
| 2006/0085269 A1 | 4/2006 | Guilfoyle |
| 2006/0085334 A1 | 4/2006 | Murphy |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0190322 A1 | 8/2006 | Oehlerking et al. |
| 2006/0206402 A1 | 9/2006 | Sullivan |
| 2006/0212392 A1 | 9/2006 | Brown |
| 2006/0212393 A1 | 9/2006 | Lindsay Brown |
| 2006/0224502 A1 | 10/2006 | McGowan |
| 2006/0249570 A1* | 11/2006 | Seifert et al. ............ 235/380 |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1 | 3/2007 | LeFebvre |
| 2007/0083462 A1 | 4/2007 | Cubillo et al. |
| 2007/0100745 A1 | 5/2007 | Keiser |
| 2007/0106603 A1 | 5/2007 | Whyte et al. |
| 2007/0136194 A1* | 6/2007 | Sloan ............................ 705/41 |
| 2007/0152038 A1 | 7/2007 | Ciancio et al. |
| 2007/0174189 A1 | 7/2007 | Bishop et al. |
| 2007/0175984 A1 | 8/2007 | Khandaker et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0233596 A1 | 10/2007 | Ambrose |
| 2007/0250380 A1 | 10/2007 | Mankoff |
| 2007/0260536 A1 | 11/2007 | Stone |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2008/0005001 A1 | 1/2008 | Davis et al. |
| 2008/0021772 A1 | 1/2008 | Aloni et al. |
| 2008/0040261 A1 | 2/2008 | Nix et al. |
| 2008/0040265 A1 | 2/2008 | Rackley, III et al. |
| 2008/0052189 A1 | 2/2008 | Walker et al. |
| 2008/0059363 A1 | 3/2008 | Hotz et al. |
| 2008/0091519 A1 | 4/2008 | Foss |
| 2008/0103970 A1 | 5/2008 | Books et al. |
| 2008/0120129 A1 | 5/2008 | Seubert et al. |
| 2008/0140561 A1 | 6/2008 | Neel |
| 2008/0140568 A1 | 6/2008 | Henry |
| 2008/0162271 A1 | 7/2008 | Benjamin |
| 2008/0210753 A1 | 9/2008 | Plozay et al. |
| 2008/0228643 A1 | 9/2008 | Hall |
| 2008/0235095 A1 | 9/2008 | Oles et al. |
| 2008/0270298 A1 | 10/2008 | McElroy et al. |
| 2008/0281734 A1 | 11/2008 | Longe et al. |
| 2008/0294977 A1 | 11/2008 | Friedman et al. |
| 2008/0301162 A1 | 12/2008 | Wall et al. |
| 2009/0048963 A1 | 2/2009 | Bishop et al. |
| 2009/0063297 A1 | 3/2009 | Dooley et al. |
| 2009/0063342 A1 | 3/2009 | Beckers |
| 2009/0063351 A1 | 3/2009 | Schmeyer et al. |
| 2009/0157220 A1 | 6/2009 | Walker et al. |
| 2009/0164362 A1 | 6/2009 | Moore |
| 2009/0164363 A1 | 6/2009 | Ahlers |
| 2009/0171775 A1 | 7/2009 | Cashion et al. |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076875 A1 | 3/2010 | Ernst et al. |
| 2010/0106555 A1 | 4/2010 | Mneimneh et al. |
| 2010/0222132 A1 | 9/2010 | Sanford et al. |
| 2010/0280949 A1 | 11/2010 | Van Rensburg |
| 2010/0306104 A1 | 12/2010 | Johnson |
| 2010/0312684 A1 | 12/2010 | Kemper et al. |
| 2011/0047039 A1 | 2/2011 | Crames et al. |
| 2011/0106698 A1 | 5/2011 | Isaacson et al. |
| 2011/0270664 A1 | 11/2011 | Jones |

FOREIGN PATENT DOCUMENTS

| | | |
|---|---|---|
| EP | 0619565 A1 | 10/1994 |
| EP | 0348932 A2 | 5/1995 |
| JP | 2-238593 A | 9/1990 |
| JP | 2-278495 A | 11/1990 |
| JP | 3-100791 A | 4/1991 |
| JP | 4-165588 A | 6/1992 |
| KR | 2010010217 | 2/2010 |
| WO | WO 86/02757 A1 | 5/1986 |
| WO | WO 86/07647 A1 | 12/1986 |
| WO | WO 88/03297 A1 | 5/1988 |
| WO | WO 89/08899 A1 | 9/1989 |
| WO | WO 91/09370 A1 | 6/1991 |
| WO | WO 93/09515 A1 | 5/1993 |
| WO | WO 94/10649 A1 | 5/1994 |
| WO | WO 94/28498 A1 | 12/1994 |
| WO | WO 95/03570 A2 | 2/1995 |
| WO | WO 97/46986 A1 | 12/1997 |
| WO | WO0060487 | 10/2000 |
| WO | WO 2007133315 A2 | 11/2007 |
| WO | 2008102329 A2 | 8/2008 |
| ZA | 200709282 | 10/2007 |

OTHER PUBLICATIONS

John P. Caskey and Gordon H. Selton, Jr.; Is the Debit Card Revolution Finally Here?; Federal Reserve Bank of Kansas City, Economic Review; Fourth Quarter 1994; pp. 70-95, vol. 79 #4 (17 pages).

Laura Castaneda; Business Promote Services to Customers Day in and Day Out; The Dallas Morning News, Nov. 26, 1994 (3 pages).

Margaret Mannix, Checkout Tech, U.S. News and World Report, Feb. 27, 1995 (6 pages).

Credit Terminals to be Used at Canadian Liquor Outlets, Card News, Jan. 23, 1995 (1 page).

Debit Card Popularity on the Rise, Chain Store Age Executive, Jan. 1994 (1 page).

Debit Goes to Dinner, Credit Card Management, New York, Oct. 1994 (2 pages).

Alan Peppard, Down and Dirty in Deep Ellum, The Dallas Morning News, Dec. 3, 1994 (2 pages).

Everest Reference Manual, VeriFone Part No. 25399, Revision A, Manual Revision 1.0, Jul. 1995 (66 pages).

Express Cards and Trains, Chain Store Age Executive Edition, Jan. 1995 (1 page).
Suzanne Brown, Goodnight Amy, Meg, Beth and Jo, Rocky Mountain News, Dec. 8, 1994 (1 page).
Robert J. Klein, Here Comes the Debit Card, D&B Reports, Jul./Aug. 1990 (2 pages).
Hypercom S7C Advertisement, Chain Store Age, Sep. 1995 (4 pages).
Hypercom S7SC Advertisement, Chain Store Age, Feb. 1996 (2 pages).
IBM 4680-4690 Advanced Payment System for Chain Drug Sales Application User's Guide, Nov. 1996 (256 pages).
IBM 4680-4690 Advanced Payment System for Chain Drug Sales Application User's Guide, Jul. 1996 (248 pages).
IBM 4680-4690 Advanced Payment System for Supermarket Application User's Guide, Sep. 1996 (222 pages).
Fox, Linda A., Keep an Eye on Your Credit Card, The Toronto Sun, Aug. 9, 1996 (1 page).
Pyatt, Rudolph A., Jr., Mobil Stations to Permit Use of Bank Cards, The Washington Post (1 page).
NCR 4430-5000 MSR/PIN User's Guide, 1994 (265 pages).
Nieman Marcus: High-Tech for the Holidays, Adweek, Dec. 5, 1994 (1 page).
Neiman Marcus Offers Electronic Gift Certificate, Card Fax, Jan. 23, 1995 (1 page).
Neiman Marcus to Launch NM Express Automated Gift Card, PR Newswire, Nov. 22, 1994 (1 page).
NM Express Card Advertisement, The New Yorker, Dec. 12, 1994 (3 pages).
Service Mark Registration No. 1,981,044 for "NM Express Card", registered Jun. 18, 1996 (1 page).
Omni 480/490 Programmer's Guide, VeriFone Part No. 12924—Revision A, Manual Revision 1.0, Oct. 1993 (228 pages).
One Company's Diversification Shakes Up Peripherals Market, Chain Store Age, Jun. 1996 (3 pages).
O'Keefe, Michael, Portable POS Debit Terminal Mean Greater Convenience, Bank Systems & Technology, Nov. 1994 (2 pages).
POS Terminal Can Handle Direct Debits, ABA Banking Journal, Sep. 1984 (2 pages).
Racal Corp. Advertisement, POS Terminal Eliminates Credit Card Vouchers, ABA Banking Journal, Nov. 1985 (2 pages).
Szabo, Joan C., The Changing World of Financial Services, Nation's Business, Oct. 1994 (7 pages).
VeriFone Everest Advertisement, Stores, May 1995 (2 pages).
VeriFone Folio (TM) Brings Credit and Debit Card Payment to the Restaurant Table, PR Newswire, May 16, 1994 (3 pages).
David B. Barnes, VeriFone Introduces Everest (TM) Customer Activated Payment System to Multi-lane Retail Market, PR Newswire, Feb. 20, 1995 (2 pages).
VeriFone Introduces Pinpad (TM) 1000 to Point-of-Sale Debit Market, M2 Presswire, Apr. 21, 1995 (1 page).
VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, Verifone Part No. 00483-Revision D, Manual Revision 3.01, Apr. 1990 (144 pages).
MicroTrax Ltd. Omni 490M (and 490ML) Operation Manual for Integrated and Non-Integrated Configurations, 1994 (60 pages).
MicroTrax Electronic Payment Systems: The MicroTrax Pinstripe Lane Equipment Users Guide, MicroTrax Ltd., Newport Beach, CA 1991 (54 pages).
IBM 4680-4690 Supermarket Application—Electronic Funds Transfer Feature Enhancement: User's Guide, IBM Corp., Research Triangle Park, NC, Sep. 1995 (318 pages).
IBM 4680 General Sales Application Electronic Funds Transfer User's Guide, IBM Corp., Research Triangle Park, NC, Dec. 1990 (260 pages).
IBM 4680 General Sales Application Electronic Funds Transfer User's Guide, IBM Corp., Research Triangle Park, NC, Mar. 1991 (263 pages).
IBM 4680 General Sales Application: Guide to Operations, Research Triangle Park, NC, Jun. 1991 (429 pages).
Krino, Gary, et al., A Birthday Card That Pays Off, The Orange County Register, Jul. 19, 1996 (2 pages).
Cohen, Bruce, Alternative to Cash Gains Ground, The Financial Post, Apr. 22, 1994 (2 pages).
Bank of Boulder POS Debit Solution at the Table Now in Beta: First Bank to Certify IVI Spirit C2000 on MAPP (R), Business Wire, Aug. 3, 1994 (1 page).
Co-pending U.S. Appl. No. 12/562,331, filed Sep. 18, 2009, titled Computerized Extension of Credit to Existing Demand Deposit Accounts, Prepaid Cards and Lines of Credit Based on Expected Tax Refund Proceeds, Associated Systems and Computer Program Products.
Co-pending U.S. Appl. No. 12/700,681, filed Feb. 4, 2010, titled System and Computer Program Product to Issue a Retail Prepaid Card Including a User-Designed External Face Using a Chit and Related Computer Implemented Methods.
Co-pending U.S. Appl. No. 12/814,405, filed Jun. 11, 2010, titled Environmental-Friendly Fuel Credit Card System, Program Product, and Computer-Implemented Methods.
Co-pending U.S. Appl. No. 12/877,490, filed Sep. 8, 2010, titled System, Program Product, and Method for Debit Card and Checking Account Autodraw.
Co-pending U.S. Appl. No. 12/877,524, filed Sep. 8, 2010, titled System, Program Product, and Method for Debit Card and Checking Account Autodraw.
Co-pending U.S. Appl. No. 12/889,281, filed Sep. 23, 2010, titled Computer-Implemented Methods, Computer Program Products, and Systems for Enhanced Loan Product Repayments.
Co-pending U.S. Appl. No. 12/892,847, filed Sep. 28, 2010, titled Computer-Implemented Methods, Computer Program Products, and Systems for Management and Control of a Loyalty Rewards Network.
Co-pending U.S. Appl. No. 12/731,852, filed Mar. 25, 2010, titled Machine, Program Product, and Computer Implemented Methods for Confirming a Mobile Banking Request.
Co-pending U.S. Appl. No. 13/036,076, filed Feb. 28, 2011, titled Machine, Program Product, and Computer Implemented Method to Construct a Person-To-Person Loan.
Office Action dated Feb. 18, 2011, in co-pending U.S. Appl. No. 12/338,402.
Office Action dated Mar. 4, 2011, in co-pending U.S. Appl. No. 12/338,684.
Office Action dated Mar. 17, 2011, in co-pending U.S. Appl. No. 12/417,199.
Office Action dated Mar. 17, 2011, in co-pending U.S. Appl. No. 12/465,803.
Office Action dated Mar. 22, 2011, in co-pending U.S. Appl. No. 12/338,584.
Office Action dated Mar. 29, 2011, in co-pending U.S. Appl. No. 12/417,211.
Office Action dated Mar. 29, 2011, in co-pending U.S. Appl. No. 12/407,320.
International Search Report from co-pending PCT Application No. PCT/US2009/034692 filed Feb. 20, 2009 titled "Methods to Advance Loan Proceeds on Prepaid Cards, Associated Systems and Computer Program Products".
Co-pending U.S. Appl. No. 12/397,113, filed Mar. 3, 2009, titled "Person-to-Person Lending Program Product, System, and Associated Computer-Implemented Methods".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/417,199, filed Apr. 2, 2009, titled "System, Program Product, and Associated Methods to Autodraw for Micro-Credit Attached to a Prepaid Card".
Co-pending U.S. Appl. No. 12/417,211, filed Apr. 2, 2009, titled "System, Program Product, and Associated Methods to Autodraw for Micro-Credit Attached to a Prepaid Card".
Co-pending U.S. Appl. No. 12/417,182, filed Apr. 2, 2009, titled "System, Program Product, and Method to Authorize Draw for Retailer Optimization".
Co-pending U.S. Appl. No. 12/407,320, filed Mar. 19, 2009, titled "Computerized Extension of Credit to Existing Demand Deposit Accounts, Preparid Cards and Lines of Credit Based on Expected Tax Refund Proceeds, Associated Systems and Computer Program Products".

Co-pending U.S. Appl. No. 12/417,162, filed Apr. 2, 2009, titled "System, Program Product, and Method for Debit Card and Checking Account Autodraw".

Co-pending U.S. Appl. No. 12/367,187, filed Feb. 6, 2009, titled "Government Targeted-Spending Stimulus Card System, Program Product and Computer-Implemented Methods".

Co-pending U.S. Appl. No. 12/465,277, filed May 13, 2009, titled "System, Program Product, and Computer-Implemented Method for Loading a Loan on a Pre-Paid Card".

Co-pending U.S. Appl. No. 12/465,306, filed May 13, 2009, titled "System, Program Product, and Computer-Implemented Method for Loading a Loan on an Existing Pre-Paid Card".

Co-pending U.S. Appl. No. 12/465,803, filed May 13, 2009, titled "System, Program Product, and Method for Loading a Loan on a Pre-Paid Card".

Orszag, Peter, "Unemployment Insurance as an Economic Stimulus", Center for Budget and Policy Priorities, Nov. 15, 2011.

Powell, Robert L., "Statewide Electronic Commerce Program Status Report", State of North Carolina Office of the State Controller, Mar. 7, 2007.

Parrott, James, "Jittery Wall Street, Calm City?", Gotham Gazette, Apr. 16, 2007.

Zandi, Mark, "Washington Throws the Economy a Rope", Moody's Economy.com, Jan. 22, 2008.

Blair, Christine E., et al., "Challenges to the Dual Banking System: The Funding of Bank Supervision", FDIC Bank Review, Mar. 31, 2006.

Office Action for co-pending U.S. Appl. No. 12/367,187 dated Jun. 27, 2011.

"Developing Asia and the World", Asian Development Bank 2002.

Notice of Allowance in co-pending U.S. Appl. No. 12/554,659 dated Aug. 2, 2011.

Office Action in co-pending U.S. Appl. No. 12/338,712 dated Jul. 28, 2011.

Office Action in co-pending U.S. Appl. No. 12/338,440 dated Aug. 1, 2011.

Financial Advice Investment Money Oct. 1, 2009 at 5:50pm, HSBC Offshore Internet Banking (as cited on Notice of Allowance in co-pending U.S. Appl. No. 12/554,659).

Financial Advice Investment Money Oct. 1, 2009 at 7:25am, HSBC Offshore Internet Banking (as cited on Notice of Allowance in co-pending U.S. Appl. No. 12/554,659).

International Search Report for PCT/US2009/043988 dated Jul. 14, 2009.

International Search Report for PCT/US2009/039492 dated May 14, 2009.

International Search Report dated May 27, 2009 for PCT/US2009/039504 filed Apr. 3, 2009.

International Search Report dated Jun. 8, 2009 for PCT/US2009/039512 filed Apr. 3, 2009.

International Search Report dated Jun. 30, 2009 for PCT/US2009/043978 filed May 14, 2009.

Office Action dated Jul. 9, 2010 for U.S. Appl. No. 12/338,365.

Office Action dated Jul. 9, 2010 for U.S. Appl. No. 12/338,645.

Co-pending U.S. Appl. No. 12/554,659, filed Sep. 4, 2009, titled "System, Method, and Program Product for Foreign Currency Travel Account".

Co-pending U.S. Appl. No. 12/554,432, filed Sep. 4, 2009, titled "System, Program Product and Methods for Retail Activation and Reload Associated With Partial Authorization Transactions".

Cross, Sam Y., All About . . . the Foreign Exchange Market in the United States, 1998, Federal Reserve Bank of New York.

Office Action dated Sep. 28, 2010 for co-pending U.S. Appl. No. 12/338,402, filed Dec. 18, 2008.

Office Action dated Sep. 3, 2010 for co-pending U.S. Appl. No. 12/417,162, filed Apr. 2, 2009.

Co-pending U.S. Appl. No. 12/607,780, filed Oct. 28, 2009, titled Shopping Center Gift Card Offer Fulfillment Machine, Program Product, and Associated Methods.

Co-pending U.S. Appl. No. 12/609,896, filed Oct. 30, 2009, titled Machine Methods, and Program Product for Electronic Order Only.

Co-pending U.S. Appl. No. 12/626,349, filed Nov. 25, 2009, titled Machine, Methods, and Program Product for Electronic Inventory Tracking.

International Search Report for PCT/US09/56072 dated Oct. 20, 2009.

Bank Deals—Best Rates and Deals: EverBank's World Currency CDs—My Interview with EverBank's Executive Frank Trotter, http://bankdeals.blogspot.com, Jul. 29, 2007.

Foreign Exchange Market, http://en.wikipedia.org.

Avoid Gift Card Pitfalls, ConsumerReports.org.

VIPGift Receives Investment From Summit Partners and Bridgescale Partners, Nov. 11, 2008, Chattanooga, TN and Palo Alto, CA.

Jane Boon Pearlstine, Lenders, Borrowers Hook Up Over the Web: Prosper.com and Other Sites Provide Forum for Individual Bidders Willing to Offer Small Loans, Wall Street Journal, May 20, 2006.

United Nations Conference on Trade and Development, E-finance and Small and Medium-Size Enterprises (SMEs) in Developing and Transition Economies, UNCTAD Expert Meeting, Oct. 17, 2001.

Tim Jones, Paradigms lost, RSA Journal, Oct. 2006, pp. 28-31.

Diego Rumiany, Internet Bidding for Microcredit: making it work in the developed world, conceiving it for the developing world, Mar. 2007.

Stefan Heng, Thomas Meyer, and Antje Stobbe, implications of Web 2.0 for financial institutions: Be a driver, not a passenger, Munich Personal RePEc Archive, Jul. 31, 2007,.

Matt Flannery, Kiva and the Birth of Person to Person Microfinance, Innovations, pp. 31-56, Winter & Spring 2007.

Michael K Hulme and Collette Wright, Internet Based Social Lending: Past, Present and Future, Social Futures Observatory, Oct. 2006.

Richard W. Coleman, Is the Future of the Microfinance Movement to be Found on the Internet?, International Trade and Finance Association Working Papers 2007.

Amanda Scott and Patrick Towell, The web we weave, Financial World, pp. 12-15, Nov. 2006.

Prosper, Access and Transparency through Person-to-Person Lending, FDIC Advisory Committee on Economic Inclusion, Mar. 28, 2007.

Co-pending U.S. Appl. No. 12/338,365, filed Dec. 18, 2008, titled "Transfer Account Systems, Computer Program Products, and Associated Computer-Implemented Methods".

Co-pending U.S. Appl. No. 12/338,402, filed Dec. 18, 1008, titled "Transfer Account Systems, Computer Program Products, and Associated Computer-Implemented Methods".

Co-pending U.S. Appl. No. 12/338,440, filed Dec. 18, 2008, titled "Transfer Account Systems, Computer Program Products, and Associated Computer-Implemented Methods".

Co-pending U.S. Appl. No. 12/338,712, filed Dec. 18, 2008, titled "Computer-Implemented Methods, Program Product, and System to Enhance Banking Terms Over Time".

Co-pending U.S. Appl. No. 12/338,684, filed Dec. 18, 2008, titled "Transfer Account Systems, Computer Program Products, and Associated Methods".

Co-pending U.S. Appl. No. 12/338,540, filed Dec. 18, 2008, titled "Private Label Promotion Card System, Program Product, and Associated Computer-Implemented Methods".

Co-pending U.S. Appl. No. 12/338,584, filed Dec. 18, 2008, titled "Transfer Account Systems, Computer Program Products, and Methods to Prioritize Payments From Preselected Bank Accounts".

Co-pending U.S. Appl. No. 12/338,645, filed Dec. 18, 2008, titled "Transfer Account Systems, Computer Program Products, and Methods to Prioritize Payments From Preselected Bank Accounts".

Office Action in co-pending U.S. Appl. No. 12/609,896 dated Apr. 5, 2011.

Office Action in co-pending U.S. Appl. No. 12/417,162 dated Apr. 13, 2011.

Notice of Allowance from co-pending U.S. Appl. No. 12/609,896 dated Jan. 3, 2012.

Notice of Allowance from co-pending U.S. Appl. No. 13/233,268 dated Dec. 13, 2011.

Office Action from co-pending U.S. Appl. No. 12/367,187 dated Jan. 6, 2012.

Office Action from co-pending U.S. Appl. No. 12/731,852 dated Dec. 22, 2011.
Notice of Allowance from co-pending U.S. Appl. No. 12/465,803 dated Dec. 12/465,803 dated Dec. 20, 2011.
MonsterCard Electronic prepaid (Oct. 2003). The Nilson Report, (798), (Dec. 9, 2011), The Banking Source (Document ID 474833171).
Final Office Action in co-pending U.S. Appl. No. 12/338,584 dated Sep. 15, 2011.
Final Office Action in co-pending U.S. Appl. No. 12/338,684 dated Sep. 23, 2011.
Lazarus, David, "120% rate for Wells' Advances", Oct. 16, 2004, San Francisco Chronicle (cited in Final Office Action in co-pending U.S. Appl. No. 12/338,684 dated Sep. 23, 2011).
Office Action in co-pending U.S. Appl. No. 12/397,113 dated Sep. 30, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Office Action from co-pending U.S. Appl. No. 12/626,349, dated Nov. 22, 2011.
Downes, How to avoid exchange charges Wasting Money a foreign currency bank account could be the answer, The Daily Telegraph, London (UK), Mar. 10, 2007.
Office Action for co-pending U.S. Appl. No. 13/232,405 dated Feb. 2, 2012.
Office Action for co-pending U.S. Appl. No. 12/877,524 dated Feb. 14, 2012.
Notice of Allowance for co-pending U.S. Appl. No. 12/417,182 dated Feb. 14, 2012.
Final Office Action for co-pending U.S. Appl. No. 12/465,277 dated Feb. 28, 2012.
Office Action for co-pending U.S. Appl. No. 12/607,780 dated Mar. 19, 2012.
Notice of Allowance for co-pending U.S. Appl. No. 12/562,331 dated Mar. 20, 2012.
Notice of Allowance for co-pending U.S. Appl. No. 12/465,803 dated Mar. 20, 2012.
*Ex-Parte Quayle* Office Action for co-pending U.S. Appl. No. 12/770,681 dated Mar. 23, 2012.
Final Office Action for co-pending U.S. Appl. No. 12/389,749 dated Mar. 29, 2012.
Final Office Action for co-pending U.S. Appl. No. 12/731,852 dated Apr. 5, 2012.
Final Office Action for co-pending U.S. Appl. No. 12/465,306 dated Apr. 11, 2012.
Notice of Allowance for co-pending U.S. Appl. No. 13/349,423 dated Apr. 13, 2012.
Office Action for co-pending U.S. Appl. No. 12/877,490 dated Apr. 18, 2012.
Office Action for co-pending U.S. Appl. No. 12/892,847 dated Apr. 30, 2012.
Final Office Action for co-pending U.S. Appl. No. 12/338,440 dated Jan. 19, 2012.
Office Action for co-pending U.S. Appl. No. 12/465,306 dated Nov. 10, 2011.
Final Office Action for co-pending U.S. Appl. No. 12/338,540 dated Mar. 15, 2012.
ATM & Debit News, vol. 6, No. 24 dated Apr. 20, 2006.
Mangu-Ward, "Payday of Reckoning; New Laws Aimed at Kneecapping Payday Lenders Will End Up Hurting the Poor", 41(5) Reason (Oct. 2009), pp. 40-47.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Business Dateline, Q Comm Expands Calling Card Products with Best Telecom Point-of-Sale Activated Cards; All Q Comm Verifone Merchants Can Now Deliver Durable Calling Cards (Dec. 6, 2010), Business Wire (Dec. 8, 2011).
MasterCard Electronic Prepaid (Oct. 2003), The Nilson Report (798), (Dec. 20, 2011), The Banking Source (Document ID 474833171).
Congressional Budget Office, "Emerging Electronic Methods for Making Payments" (Jun. 1996), CBO.
Coady et al., "Targeted anti-poverty intervention: A selected annotated bibliography" (Apr. 2002), World Bank.

* cited by examiner

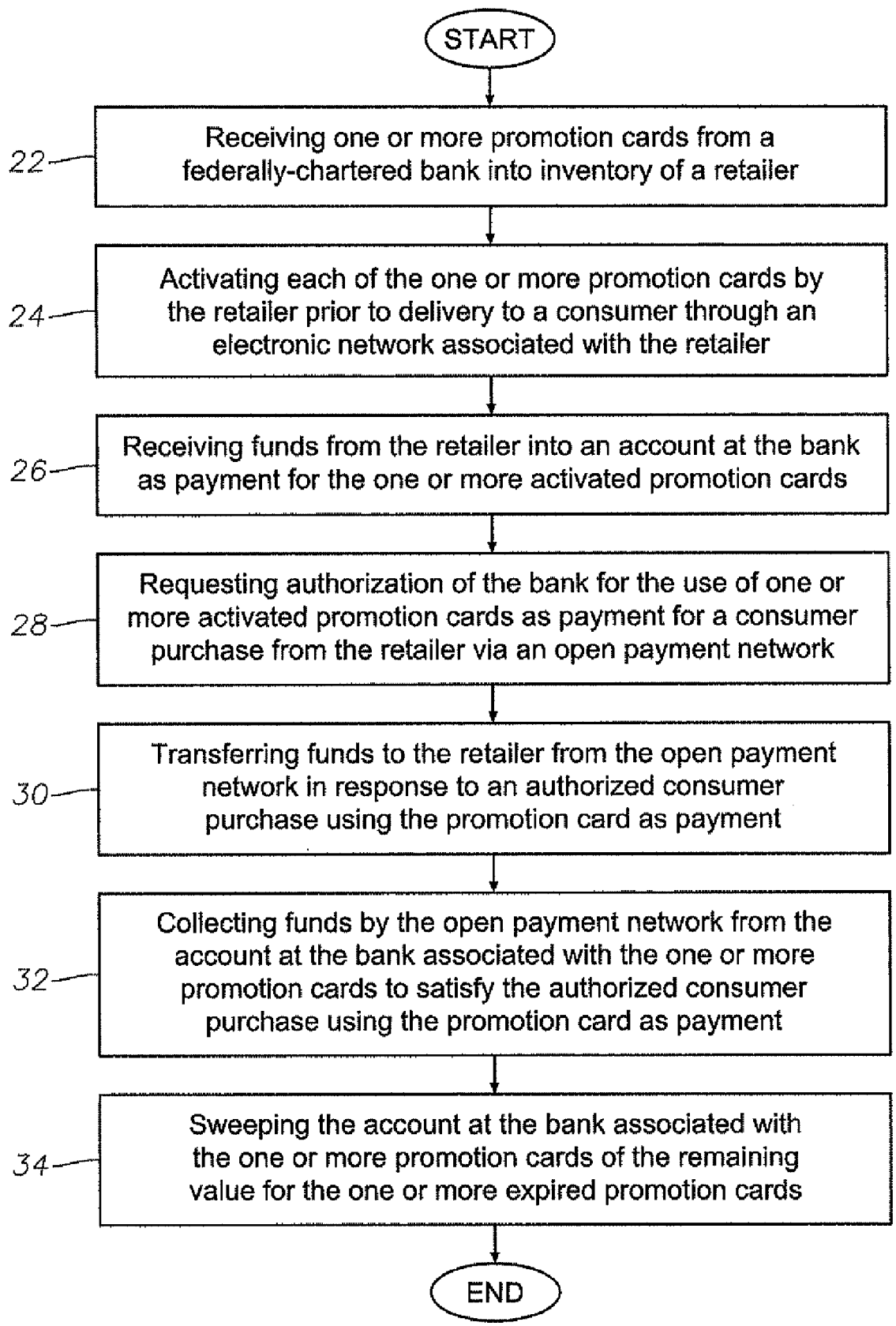

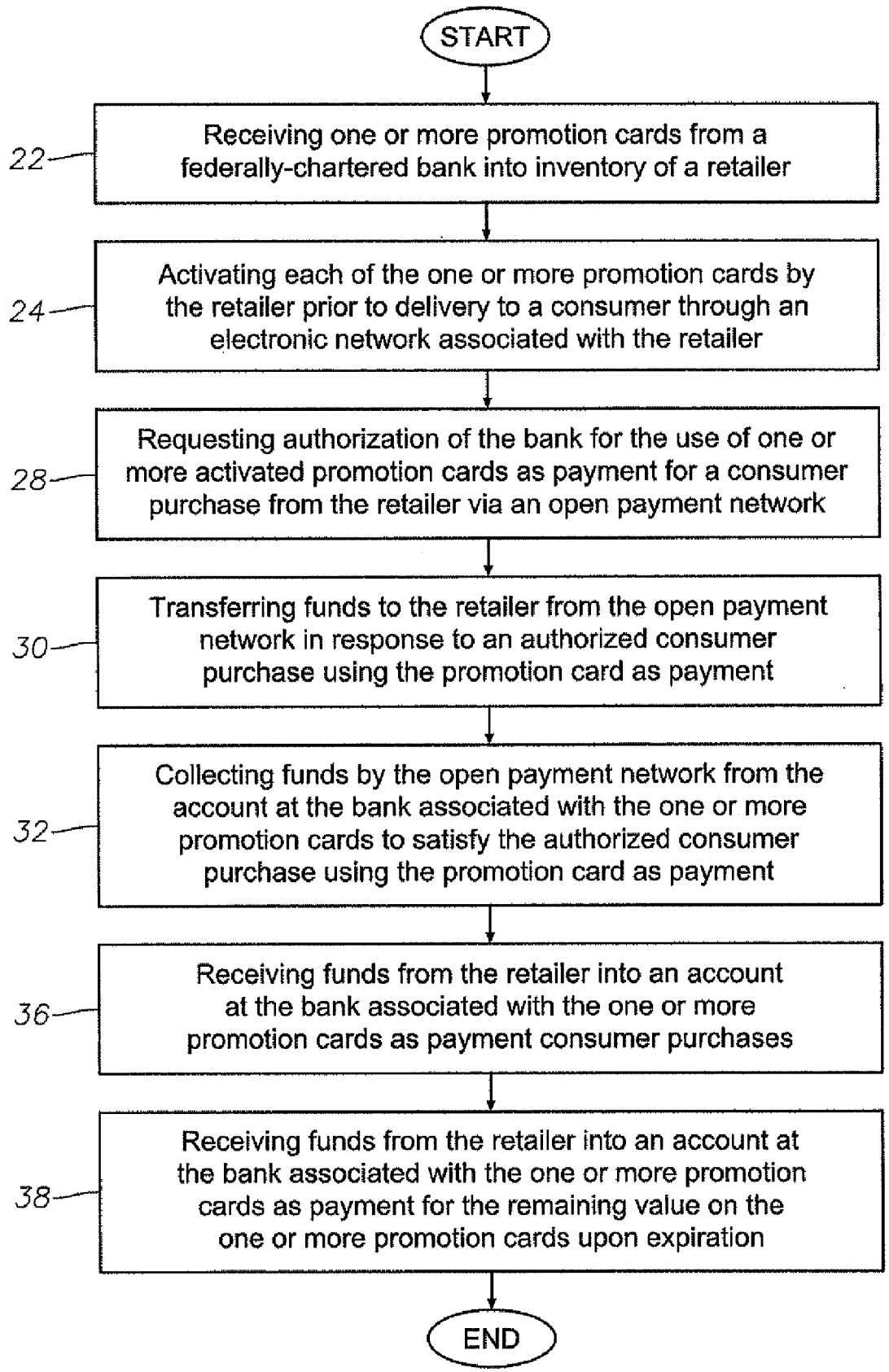

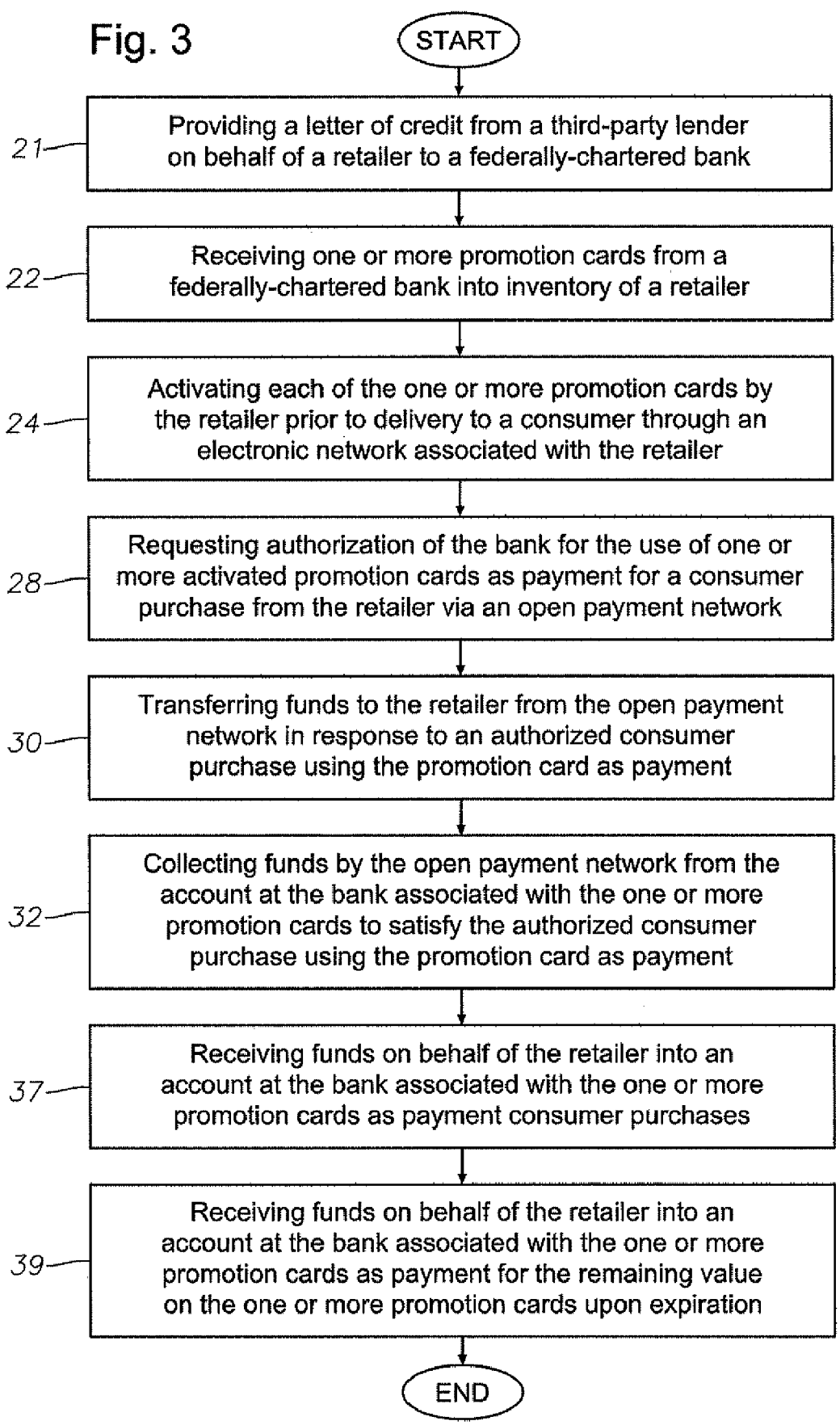

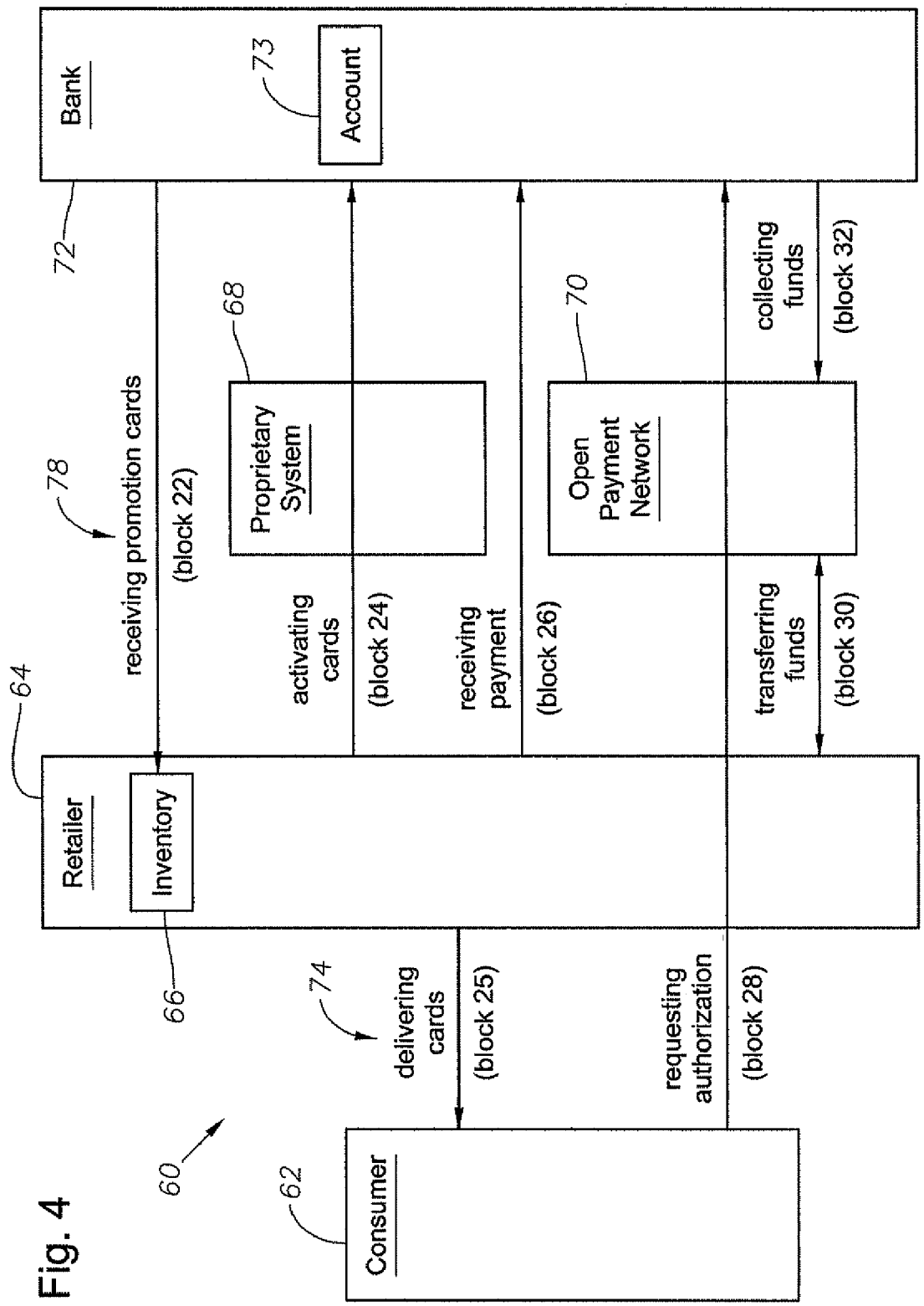

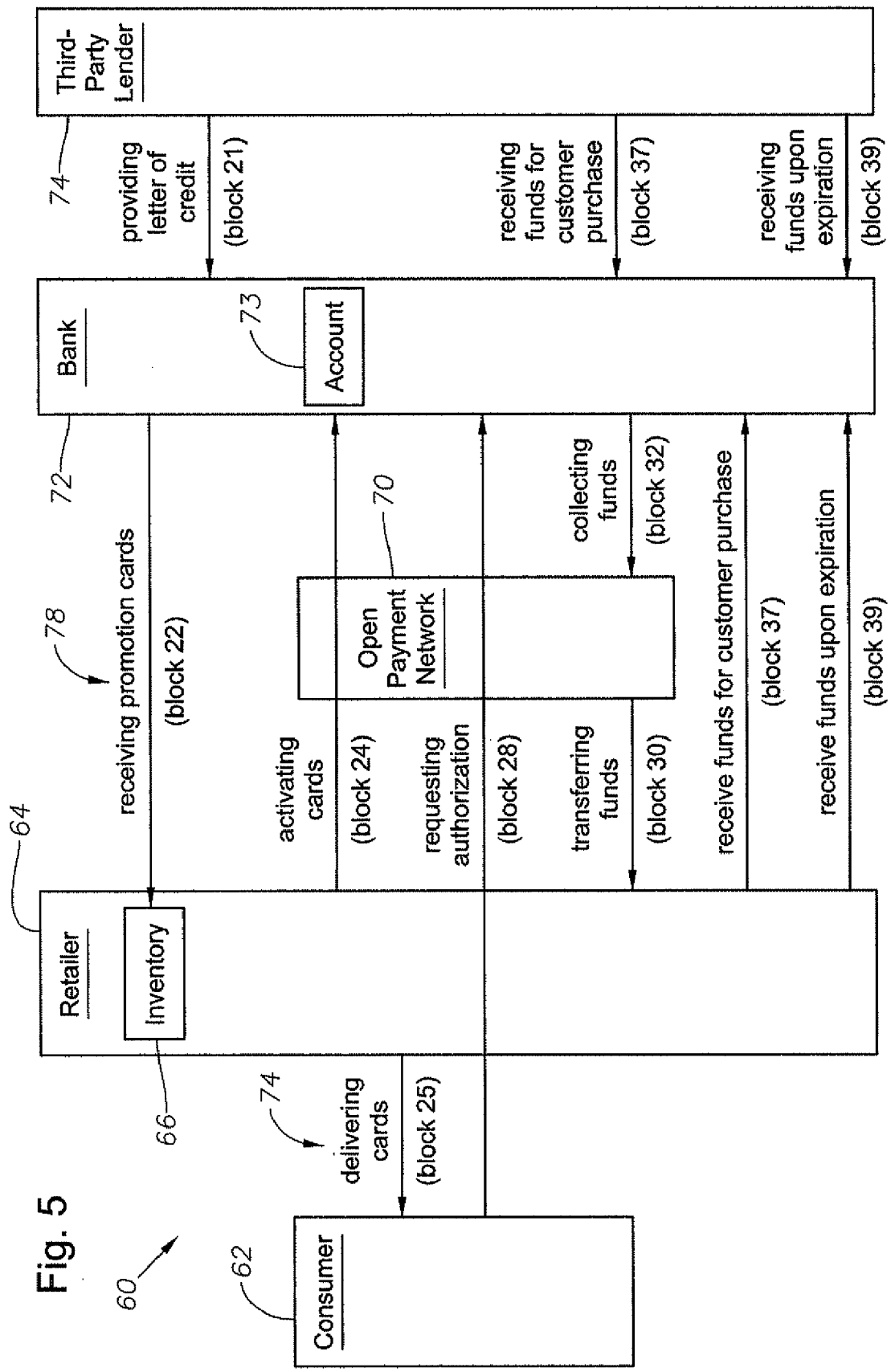

PRIVATE LABEL PROMOTION CARD SYSTEM, PROGRAM PRODUCT, AND ASSOCIATED COMPUTER-IMPLEMENTED METHODS

RELATED APPLICATIONS

This application claims priority to and the benefit of U.S. Provisional Patent Application Ser. No. 61/014,950, by Galit, titled "Private Label Promotion Card System, Program Product, and Associated Methods" filed Dec. 19, 2007, incorporated herein by reference in its entirety. This application relates to U.S. patent application Ser. No. 12/338,540, by Galit, titled "Private Label Promotion Card System, Program Product, and Associated Computer-Implemented Methods" filed on the same day as this application Dec. 18, 2008, incorporated herein by reference in its entirety.

BACKGROUND

1. Field of Invention

The present invention relates generally to the financial service and card product industries, and, more particularly, to systems, computer program products, and associated computer-implemented methods of providing rebates, in-store credit, and other promotions via a bank or private label promotion card, as well as a bank card product.

2. Background

One common and popular sales promotion today is the mail-in rebate. For example, a consumer reads in the newspaper about a promotion for a $40 manufacturer's mail-in rebate for a product that sells for $240. In fact, the promotion can advertise a price of "$200 after rebate." In turn, the consumer goes to a retailer, purchases the product for $240, and then mails in the rebate with proof of purchase. The consumer later receives a check or gift card for $40.

Long known in the art, a common sales promotion bundles in-store credit with a purchase. For example, a consumer hears a radio commercial offering $25 of in-store credit with any purchase of stereo equipment greater than $150. The consumer goes to the retailer, purchases stereo equipment for over $150 and receives with that purchase $25 of in-store credit. Rather than provide the in-store credit for use at the same time as the purchase of stereo equipment, the retailer typically provides the consumer a coupon or a store gift card providing in-store credit for use during a subsequent visit. Later the consumer returns to the retailer, presents the coupon or store gift card providing in-store credit, and receives $25 off a purchase.

Also, it has been known that banks offer and sell bank card products such as debit cards, credit cards, automatic teller machine (ATM) cards, gift or prepaid cards, and combinations thereof, e.g., ATM/debit card. Because of the convenience, flexibility, and value as a tool for promotion, cards are a common tool used by retailers millions of times a year to provide consumers with rebates, in-store credit, and promotions. Such cards are operated as store gift cards, operating on proprietary store gift card systems. Yet many of these cards are never redeemed and many of the accounting procedures for managing these card programs can be difficult, complex, or expensive. For example, retailers or other card issuers must comply with laws that govern gift cards and gift certificates that vary from state to state. Such laws typically determine whether a retailer is allowed to charge service fees against dormant accounts, what escheatment guidelines to follow, and such other requirements or guidelines as may be set forth in particular state laws. Such required action of the retailer or other card issuer makes the process more complex and, in some instances, burdensome or expensive. It is further known for banks to provide back-end financial processing, data processing, and account tracking services to various retailers to enhance business opportunities and relationships with retailers.

SUMMARY OF INVENTION

In view of the above, Applicant has recognized numerous problems with current offerings of rebates, in-store credit, and other promotions and one or more sources of these problems. For example, there are significant costs for issuing the cards and managing the transactions associated with retailer promotion cards. In addition, Applicant also recognizes that varied state laws and regulations are a source of problems with current solutions, including the management of escheatment. Escheatment involves the reversion of property to a state in the United States when there are no legal heirs or when personal property is presumed abandoned. Specifically, in the case of a gift certificate, often used as a promotional item in addition to its traditional use as a gift substitute, the retailer who offers the gift certificate may be required to carry on its financial balance sheet a liability in the event of an unredeemed gift certificate (which occurs quite frequently) until state law requires the retailer to turn over to the state the value of the gift certificate after a term for redemption, which, in some instances, can last for years. State law generally treats gift cards as gift certificates. Applicant recognizes that state escheatment laws and regulations result in, at least, two distinct problems. First, the cost and complexity of managing the escheatment process from state to state. Second, the long-term carrying of liabilities can have a negative effect on the balance sheet of the business offering the promotion, especially when it is carried on the books of the business, e.g., retailer, for a significant amount of time.

Accordingly, embodiments of the present invention provides a private label promotion card as a bank product to thereby offer consumers the same experience as today in dealing with a business, e.g., a product that can only be used at a specific retailer, and yet providing significant value to the offering businesses. Embodiments of a promotion card as defined herein, for example, include a rebate card, in-store credit card, and coupon-type card. According to embodiments of the present invention, it has been recognized that a private label promotion card can be offered, for example, by a bank, e.g., a federally-chartered bank, whose governing laws enable a consistent implementation nationally rather than subject to state banking laws and regulations, as a bank product or bank service product. A bank is an establishment for the custody, loan, exchange, or issue of money, for the extension of credit, and for facilitating the transmission of funds; a bank is typically a corporation operating under a charter from a government. Thus, the embodiments of the present invention provide a private label promotion card legally and economically distinct from others. Specifically, embodiments of the present invention include a promotion card whose value is managed by the bank offering the retailer promotion card. In addition, the retailer is able to avoid the long-term carrying of liabilities and the associated negative effects on the balance sheet, according to embodiments of the present invention.

The bank product or bank service product, according to embodiments of the present invention, has numerous other features and benefits, including being issued and managed by a bank, as opposed to being issued and managed by a retailer, mall operator, or manufacturer; use of an open payment network, e.g., VISA, MASTERCARD, DISCOVER, and AMERICAN EXPRESS networks, for purchase authorization and payments, rather than a proprietary or in-house system; and being corporately financed for promotional purposes, as opposed to being purchased by a consumer such as for gift purposes. Furthermore, one accounting feature that can be beneficial between the bank product according to embodiments of the present invention and others is that money and liability are transferred from the retailer to the bank in embodiments of the present invention, as compared to other known systems whereby money and liability stay with the retailer, for example, until usage and escheatment.

With the transfer of liability, embodiments of the present invention allow the retailer to purchase the promotion card at a discount to the face value. For example, funds being received from a retailer into a bank account associated with the one or more promotion cards as payment include an amount of funds less than the amount of funds associated with the promotion value, face value, rebate value, or other value to the consumer of the one or more cards by a consumer to thereby define a discount. That is, the bank can sell a promotion card with a face value of $50 to the retailer for some amount less than $50, according to embodiments of the present invention.

Moreover, embodiments of the present invention provide financing options to thereby enable the retailer to delay funding the bank until the consumer spends the money available on the retailer promotion card. According to embodiments of the present invention, this system can employ a bank-extended line of credit or a letter of credit from a third-party lender, whether arranged by the retailer or by the bank offering the promotion card.

Embodiments of the present invention, for example, include a system using the existing open payment network (including, for example, VISA or MASTERCARD networks), as understood by those skilled in the art, and existing point-of-sale (POS) infrastructure, as understood by those skilled in the art, to issue bank-managed, store-specific promotion cards. This embodiment of a system, for example, provides consumers with gift-card functionality comparable to a retailer-managed product of today. The bank manages the product and services of the consumers, however, rather than the retailer, according to the embodiments of the present invention.

Embodiments of the present invention also include software, or program product stored on a tangible computer memory media as a set of instructions, operable on a computer to cause the instructions to be executed by the computer, and used to manage a purchase transaction. A consumer, for example, presents the card at the POS. Then a clerk at the retailer or the consumer swipes the card, making an authorization request of an open payment network. The network routes the request to the bank providing the promotion card and services. The bank then processes the request and provides the authorization response via the open payment network to the acquiring processor. As understood by those skilled in the art, Automated Clearing House (ACH) is the name of an electronic network for financial transactions in the United States, regulated by the Federal Reserve. Embodiments also can use standard ACH file payments or wire transfers to settle accounts with the retailer and the open payment network.

Embodiments of the present invention include a computer-implemented method of funding a promotion card. The computer-implemented method, for example, includes receiving one or more promotion cards from a federally-chartered bank into inventory of a retailer. According to the embodiments of the present invention, the promotion cards are bank products subject to federal banking laws and regulations. The computer-implemented method continues with the activation of each of the one or more promotion cards by the retailer prior to delivery to a consumer. Next, funds are received from the retailer into an account at the bank associated with the one or more promotion cards as payment for the one or more activated promotion cards via an ACH file or wire transfer. Later, when a consumer attempts to make a purchase from the retailer using one or more activated promotion cards as payment, authorization is requested of the bank via an open payment network. The retailer is transferred funds from the open payment network in response to the consumer purchase. The open payment network collects funds from the account at the bank associated with the promotion cards to satisfy the consumer purchase using the promotion card as payment. An additional embodiment of a method, for example, can include the retailer mailing the promotion card to consumers in a way related to how rebate fulfillment is managed today as understood by those skilled in the art.

In addition, embodiments of the present invention provide, for example, a system for providing a promotion card such as to a retailer from a bank. The system can include a first computer associated with a retailer defining a retailer computer. The retailer computer is positioned to manage inventory of one or more promotion cards received from a bank and to activate the one or more promotion cards through an electronic network associated with the retailer, as understood by those skilled in the art. A second computer associated with the bank defines a bank computer which is positioned to manage an account associated with the one or more promotion cards. The system can also include a POS terminal having a processor defining an acquiring processor, and the POS terminal being associated with the retailer. An open payment network can be in communication with the retailer computer and the bank computer and positioned to receive authorization requests for a consumer purchase using one or more promotion cards as payment. The requests, for example, can be captured by the acquiring processor of the POS terminal associated with the retailer to thereby route the request to the bank computer through the open payment network. The open payment network, as understood by those skilled in the art, also can receive an authorization response from the bank computer, transfer funds to the retailer from the open payment network in response to an authorized consumer purchase using the promotion card as payment, and collect funds from the account at the bank associated with the one or more promotion cards to satisfy the authorized consumer purchase using the promotion card as payment. The system can further include a computer program product associated with the bank computer, stored on a tangible computer memory media, operable on a computer, and used to manage promotion card transactions. The computer program product has a set of instructions that, when executed by the computer, cause the computer to perform the operations of: processing activation information of one or more promotion cards from the retailer computer, authorizing purchase requests to use of one or more activated promotion cards as payment for a consumer purchase from the retailer via an open payment network, transferring funds to the open payment network from the account at the bank associated with the one or more promotion cards to satisfy the authorized consumer purchase using the promotion card as payment, and receiving funds into an account at the bank associated with the promotion cards on behalf of the retailer for one or more of the following: payment for the one or more activated promotion cards, payment for consumer purchases using one or more promotion cards, and payment for the value remaining on the one or more promotion cards upon expiration. The instructions can also include debiting from the account at the bank associated with the one or more promotion cards of the remaining value for the one or more expired promotion cards to thereby establish a credit for the bank. That is, the instructions can include sweeping the account of the funds associated with the expired promotion cards.

In addition, embodiments of the present invention include systems, program products, and associated computer-implemented methods of providing rebates, in-store credit, and other promotions via a bank card as will be understood by those skilled in the art, providing consumers convenience and retailers a private label promotion card legally and economically distinct from existing solutions, including improved funding options.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 1 is a schematic flow diagram of a computer-implemented method of funding a promotion card according to an embodiment of the present invention;

FIG. 2 is a schematic flow diagram of a computer-implemented method of funding a promotion card according to another embodiment of the present invention;

FIG. 3 is a schematic flow diagram of a computer-implemented method of finding a promotion card according to yet another embodiment of the present invention;

FIG. 4 is a schematic block diagram of a system to provide promotion cards according to an embodiment of the present invention;

FIG. 5 is a schematic block diagram of a system to provide promotion cards according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 8:
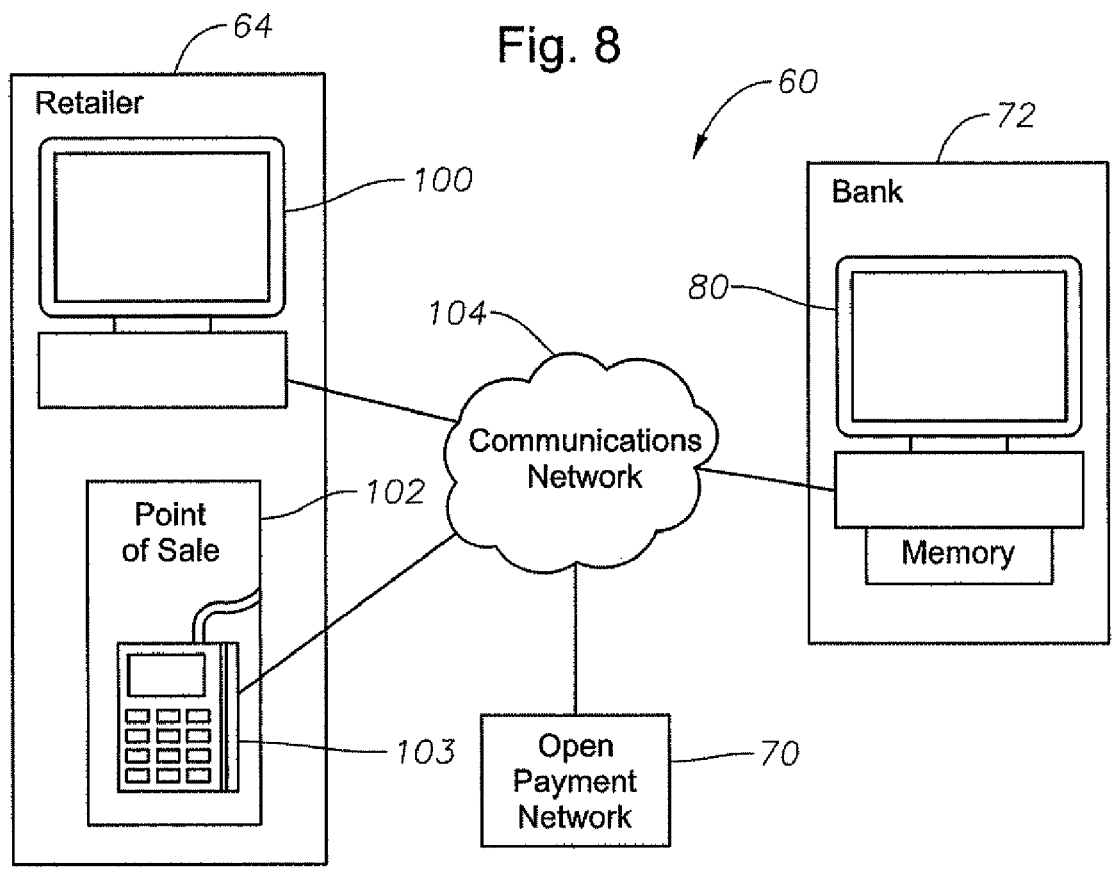
FIG. 8 is a schematic block diagram of a system to provide promotion cards according to an embodiment of the present invention.

Embodiments of the present invention, for example, provide for various ways to find a promotion card. Embodiments of a promotion card as defined herein, for example, include a gift card, a rebate card, an in-store credit card, and a coupon-type card. The structures of various types of specific prepaid cards, e.g., magnetic stripe, type of material, are well known to those skilled in the art and can be used with embodiments of the present invention. For example, as illustrated in FIGS. 1, 4, and 8, embodiments of the present invention provide for a retailer 64 to exchange funds for promotion cards 78 to a bank 72. The banks 72 can offer a discount to the retailer 64 such that the amount of funds paid by the retailer is less than the amount of funds associated with the consumer value, or face value, of the one or more promotion cards 78 (block 26). In addition, the bank manages the processing of the promotion card (block 28), absorbs the liability that all of the promotion cards will be redeemed, and absorbs the risk associated with any value of promotion cards upon its expiration (block 34), according to embodiments of the present invention. For the retailer promotion cards, the usage of the card can either be limited to usage at that specific retailer by restrictions managed by the bank authorization system or can be made available at any retailer accessible through the complete open payment network.

In another example, as illustrated in FIGS. 3, 5, and 8, embodiments of the present invention provide for a retailer 64 to receive promotion cards 78 from a bank 72. The retailer 64 pays no money upfront and pays the bank 72 only in response to a purchase by a consumer 62 using a promotion card (block 37) or upon expiration of one or more promotion cards (block 39). In addition, a third-party lender 74 can provide a letter of credit to the bank 72 on behalf of the retailer 64 (block 21) and the retailer can pay the bank in response to a purchase by a consumer 62 using a promotion card 78 (block 37) or upon expiration of one or more promotion cards (block 39), should the funds not yet have been paid by the retailer.

FIG. 1 illustrates a computer-implemented method of funding a promotion card according to an embodiment of the present invention. The computer-implemented method, for example, can begin with receiving one or more promotion cards from a bank, e.g., a federally-chartered bank, a state bank, or another type of bank entity, into inventory of a retailer (block 22). According to the embodiments of the present invention, for example, the promotion cards advantageously can be bank products subject to federal banking laws and regulations, as will be understood by those skilled in the art, so that a federally-chartered bank can offer features not available to other types of banking entities. For example, a bank organized under a federal charter is regulated by federal banking laws that can and do preempt state laws, including, for example, state escheatment laws, allowing a consistent implementation of a promotion card nationally rather than patchwork solutions with different features for the promotion card depending on each state. The computer-implemented method continues with the activation of each of the one or more promotion cards by the retailer prior to delivery to a consumer (block 24), including the bank computer processing the activation information for the promotion cards. Next, as illustrated, funds are received from the retailer into an account at the bank associated with the one or more promotion cards as payment for the activated one or more promotion cards (block 26). Later, when a consumer attempts to make a purchase from the retailer using one or more activated promotion cards as payment, authorization is requested of the bank via an open payment network (block 28), for example, as understood by those skilled in the art. Funds can be deducted funds from a promotion card, and a value remaining on the promotion card for a next, future, or other transaction can be indicated. The retailer is transferred funds through the open payment network in response to the consumer purchase (block 30), as understood by those skilled in the art. The open payment network is used to send or transfer funds from the account at the bank associated with the one or more promotion cards to satisfy the consumer purchase using one or more promotion cards as payment (block 32). That is, the bank computer transfers funds to and through the open payment network from the account at the bank associated with the one or more promotion cards, e.g., an electronic funds transfer, to satisfy the authorized consumer purchase using the one or more activated promotion cards as payment. Upon expiration of a promotion card, the account at the bank associated with the one or more promotion cards is swept of the remaining value for the one or more expired promotion cards (block 34). That is, the remaining value is debited from the account.

FIG. 2 illustrates a computer-implemented method of finding a promotion card according to another embodiment of the present invention. The computer-implemented method, for example, can begin with receiving one or more promotion cards from a federally-chartered bank into inventory of a retailer (block 22), so that the one or more cards are identified as financial assets of the retailer. According to the embodiments of the present invention, the promotion cards are bank products subject to federal banking laws and regulations. The computer-implemented method continues with the activation of each of the one or more promotion cards by the retailer prior to delivery to a consumer through an electronic network associated with the retailer (block 24), including the bank computer processing the activation information for the promotion cards. Later, when a consumer attempts to make a purchase from the retailer using one or more activated promotion cards as payment, authorization is requested of the bank via an open payment network (block 28), as understood by those skilled in the art. Funds can be deducted funds from a promotion card, and a value remaining on the promotion card for a next, future, or other transaction can be indicated. The retailer is transferred funds from the open payment network in response to the consumer purchase (block 30), as understood by those skilled in the art. The open payment network collects funds from the account at the bank associated with the one or more promotion cards to satisfy the consumer purchase using one or more promotion cards as payment (block 32). That is, the bank computer transfers funds to the open payment network from the account at the bank associated with the one or more promotion cards to satisfy the authorized consumer purchase using the one or more activated promotion cards as payment. Next, as illustrated, funds are received from the retailer into an account at the bank associated with the one or more promotion cards as payment for consumer purchases (block 36). Upon expiration of a promotion card, funds are received from the retailer into an account at the bank associated with the one or more promotion cards as payment for the value remaining on the promotion cards upon expiration (block 38).

FIG. 3 illustrates a computer-implemented method of funding a promotion card according to yet another embodiment of the present invention. The computer-implemented method illustrated in FIG. 3 shares many of the steps illustrated in FIG. 2; the computer-implemented method in FIG. 3, however, begins with providing a letter of credit, as understood by those skilled in the art, from a third-party lender on behalf of a retailer to a bank, e.g., a federally-chartered, state, or other bank (block 21). Later, funds are received on behalf of the retailer into an account at the bank associated with the one or more promotion cards as payment for consumer purchases (block 37). Upon expiration of a promotion card, funds are received on behalf of the retailer into an account at the bank associated with the one or more promotion cards as payment for the value remaining on the one or more promotion cards upon expiration (block 39). Note that unlike blocks 36 and 38, blocks 37 and 39, for example, allow for the funds to be received on behalf of the retailer to be provided under a letter of credit by the third-party lender due to, for example, account funds not being available or non-payment by the retailer.

For example, the letter of credit, as will be understood by those skilled in the art, is a technique or tool that guarantees the bank issuing the cards that should the retailer default, the bank that provides the letter of credit will provide the funds. In an embodiment, for example, the retailer may continue to make the payments to fund the spending. The letter of credit can be a way to allow the retailer to defer the funding because there is a third party guaranteeing the retailer funding. It will be understood by those skilled in the art, however, that other types of guarantees can be used as well that emulate or act as type of letter of credit or accomplish similar purposes to the letter of credit.

Embodiments of the present invention advantageously allow the retailer to purchase the promotion card at a discount to the face value. For example, funds being received from a retailer into a bank account associated with the one or more promotion cards as payment include an amount of funds less than the amount of funds associated with the promotion value, face value, rebate value, or other value to the consumer of the one or more cards by a consumer to thereby define a discount. That is, the bank can sell a promotion card with a face value of $50 to the retailer for some amount less than $50, according to embodiments of the present invention, as will be understood by those skilled in the art.

Embodiments of the present invention include both pre-denominated cards and variable denominated cards. That is, a pre-denominated card may have a predetermined or preselected amount of initial value, such as, $50 or $25, as understood by those skilled in the art. Variable denominated cards may instead be loading with any initial amount, such as, e.g., $17.63, or an amount within a range as understood by those skilled in the art. The retailer can offer, for example, a promotion card worth $25 of in-store credit with a purchase of $100 of merchandise; in addition, the retailer can also offer a promotion card worth 10% of any purchase, according to embodiments of the present invention.

Embodiments of the present invention also provide flexibility for the retailer to activate a promotion card through an open payment network or a proprietary system. An open payment network are designed and managed for interactions with third parties. As such, open payment networks provide standards, for example, for purchase authorizations and payments. These standards include, for example, interfaces, functionality, networking, hardware and software. For example, an open payment networks include, for example, VISA, MASTERCARD, DISCOVER, and AMERICAN EXPRESS networks. Those skilled in the art will understand that open payment networks can utilize and encompass numerous technologies, including, for example, the Internet, the World Wide Web, various computer networks and protocols, various wireless and satellite networks and systems, various telephone networks and systems, and point-of-sale terminals. In contrast, a proprietary system or closed or in-house system is managed privately; a proprietary system typically excludes or limits third parties interactions with the system, including, for example, exclusions or limitations imposed by software.

A system 60 to provide promotion cards 78, according to embodiments of the present invention, is also provided (see, e.g., FIG. 4). The system includes a retailer 64 being positioned to receive into inventory 66 promotion cards 78 from a bank 72 (block 22) and further being positioned to activate the promotion cards 78 prior to delivery to a consumer 62 through an electronic network associated with the retailer (block 24) via a proprietary system 68. According to embodiments of the present invention, the promotion cards 78 are bank products subject to federal banking laws and regulations and are redeemable only at the retailer 64. The system 60 also includes a bank computer 80 at the bank 72 being positioned to receive finds from the retailer into an account 73 at the bank 72 associated with the promotion cards via an ACH file or wire transfer (block 26) and further being positioned to receive an authorization request for the use of one or more activated promotion cards as payment for a consumer purchase from the retailer via an open payment network 70 (block 28). The system 60 further includes an open payment network 70 being positioned to communicate authorization requests for a consumer purchase using a promotion card as payment (block 28), to transfer funds to the retailer from the open payment network in response to an authorized consumer purchase using the promotion card as payment (block 30), and to collect funds from the account 73 at the bank associated with the one or more promotion cards to satisfy the authorized consumer purchase using the promotion card as payment (block 32). That is, the bank computer 80 transfers funds to the open payment network from the account 73 at the bank 72 associated with the one or more promotion cards to satisfy the authorized consumer purchase using the one or more activated promotion cards as payment.

FIG. 5 illustrates a system 60 to provide promotion cards 78 according to embodiments of the present invention. The system includes a retailer 64 being positioned to receive into inventory 66 promotion cards 78 from a bank 72 (block 22) and further being positioned to activate the promotion cards 78 prior to delivery to a consumer 62 through an electronic network associated with the retailer (block 24) via an open payment network 70. According to embodiments of the present invention, the promotion cards 78 are bank products subject to federal banking laws and regulations and are redeemable only at the retailer 64. The system 60 also includes a bank 72 being positioned to receive funds on behalf of the retailer, either from the retailer or a third-party lender 74 under a letter of credit, into an account 73 at the bank 72 for consumer purchases (block 37) and upon expiration of a promotion card (block 39) and further being positioned to receive an authorization request for the use of one or more activated promotion cards as payment for a consumer purchase from the retailer via an open payment network 70 (block 28). The system 60 further includes an open payment network 70 being positioned to communicate authorization requests for a consumer purchase using a promotion card as payment (block 28), to transfer funds to the retailer from the open payment network in response to an authorized consumer purchase using the promotion card as payment (block 30), and to collect funds from the account 73 at the bank associated with the one or more promotion cards to satisfy the authorized consumer purchase using the promotion card as payment (block 32). That is, the bank computer transfers funds to the open payment network from the account at the bank associated with the one or more promotion cards to satisfy the authorized consumer purchase using the one or more activated promotion cards as payment.

Figure 6A:
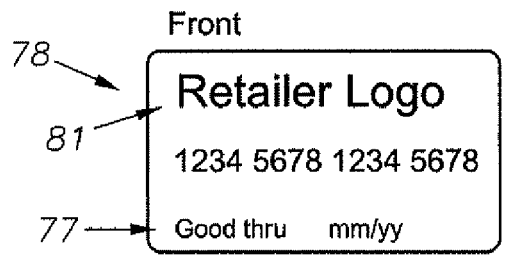
FIGS. 6A, 6B, and 6C are respective front, rear, and front elevational views of promotion card according to an embodiments of the present invention.
Figure 6B:
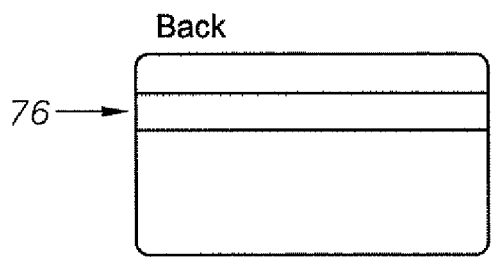
Figure 6C:
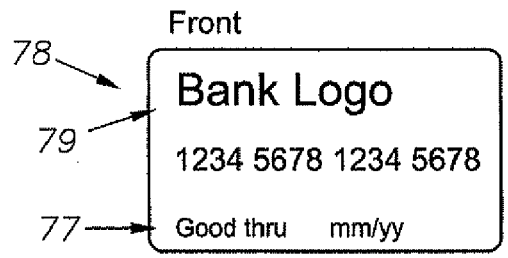

FIG. 6 illustrates an example promotion card 78 according to embodiments of the present invention, including preferably a magnetic strip 76 with account information and an expiration date 77. In addition, the one or more promotion cards 78 can have indicia 79, e.g., logo, slogans, source identifiers, thereon defining a bank brand and such brand being different than indicia 81, e.g., logo, slogans, source identifiers, of the retailer defining a retailer brand so that such one or more promotion cards each farther defines a fully branded card. It will also be understood by those skilled in the art that the retailer brand may also be left off of the card if desired as an alternative embodiment of a promotion card.

Figure 7:
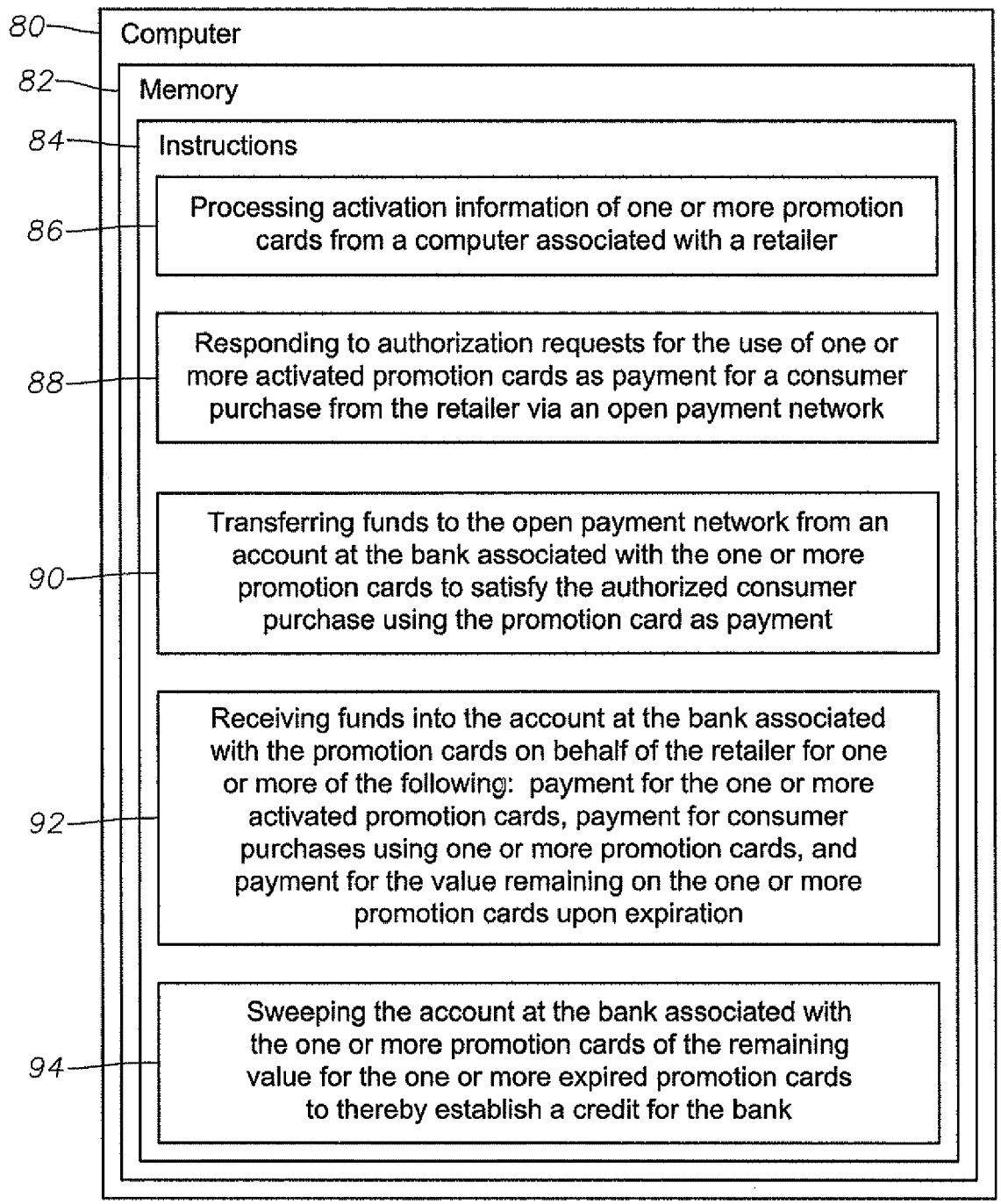
FIG. 7 is a partial schematic block diagram of computer product according to an embodiment of the present invention.

Embodiments of the present invention provide a system 60 to provide promotion cards 78, as illustrated in FIGS. 4, 5, and 8. The system, for example, includes a retailer 66 having a first computer, defining a retailer computer 100, to manage inventory 66 of one or more promotion cards 78 received from a bank 72 and to activate the one or more promotion cards 78 through an electronic or communications network 104, as understood by those skilled in the art. The retailer 64 also has a point-of-sale (POS) 102 terminal or interface including an acquiring processor 103, as understood by those skilled in the art. In addition, the system includes a bank 72 having a second computer, defining a bank computer 80, to manage an account 73 at the bank associated with the one or more promotion cards 78. The bank computer includes a program product in the form of instructions stored in memory and executable by the bank computer as illustrated in FIG. 7 and discussed below. The system further includes an open payment network 70 to receive authorization requests captured by an acquiring processor 103 for a purchase by a consumer 62 using one or more promotion cards 78 as payment, route the request to the bank computer 80, receive an authorization response from the bank computer 80, transfer funds to the retailer 64 from the open payment network 70 in response to an authorized consumer purchase using the promotion card 78 as payment, and collect funds from the account 73 at the bank associated with the one or more promotion cards 78 to satisfy the authorized consumer purchase using the promotion card as payment.

Embodiments of the present invention also include a computer program product, as illustrated in FIG. 7, stored on a tangible computer memory media 82, operable on a computer 80 associated with a bank, and used to manage promotion card transactions. The computer program product, for example, includes a set of instructions 84 that, when executed by the computer, cause the computer to perform the various operations, including processing activation information of one or more promotion cards from the retailer computer (block 86). The operations also include authorizing purchase requests for the use of one or more activated promotion cards as payment for a consumer purchase from the retailer via an open payment network (block 88), as understood by those skilled in the art, and transferring funds to and through the open payment network from the account at the bank associated with the one or more promotion cards to satisfy the authorized consumer purchase using the promotion card as payment (block 90). In addition, the operations further include receiving fiends into an account at the bank associated with the promotion cards on behalf of the retailer for one or more of the following: payment for the one or more activated promotion cards, payment for consumer purchases using one or more promotion cards, and payment for the value remaining on the one or more promotion cards upon expiration (block 92). The operations, for example, also can include debiting the account at the bank associated with the one or more promotion cards of the remaining value for the one or more expired promotion cards to thereby sweep the account and establish a credit for the bank (block 94).

Figure 9:
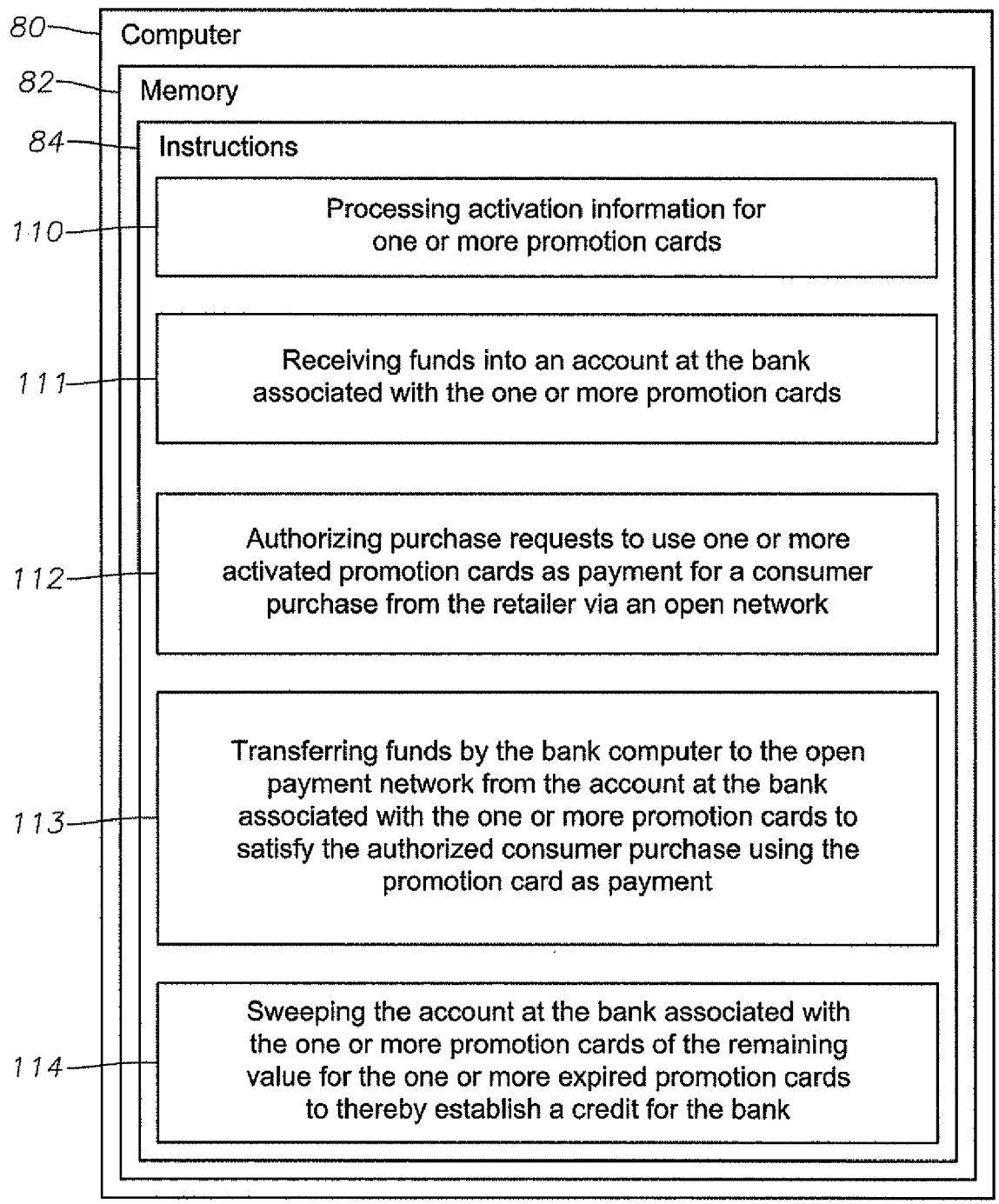
FIG. 9 is a schematic block diagram of a system to provide promotion cards according to an embodiment of the present invention.

Embodiments of the present invention also include a computer program product, as illustrated in FIG. 9, stored on a tangible computer memory media 82, operable on a computer 80 associated with a bank, and used to manage promotion card transactions. The computer program product, for example, includes a set of instructions 84 that, when executed by the computer, cause the computer to perform the various operations, including processing activation information of one or more promotion cards (block 110). The operations also include receiving funds into an account at the bank associated with the promotion cards on behalf of the retailer for payment for the one or more activated promotion cards (block 111). The operations further include authorizing purchase requests for the use of one or more activated promotion cards as payment for a consumer purchase from the retailer via an open payment network (block 112), as understood by those skilled in the art, and transferring funds to the open payment network from the account at the bank associated with the one or more promotion cards to satisfy the authorized consumer purchase using the promotion card as payment (block 113). In addition, the operations, for example, can include debiting the account at the bank associated with the one or more promotion cards of the remaining value for the one or more expired promotion cards to thereby sweep the account and establish a credit for the bank (block 114).

A person having ordinary skill in the art will recognize that various types of memory are readable by a computer such as described herein, e.g., retailer computer, bank computer, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer or a server. It will be understood by those skilled in the art that such media can, be at other locations instead of or in addition to the bank computer or server to store program products, e.g., including software, thereon. Each of these computer servers, for example, can having one or more of these various types of memory as understood by those skilled in the art. In addition, the present invention is not described with reference to any particular programming language. It will be understood that a variety of programming languages may be used to implement the systems, program products, software, and computer-implemented methods as described herein.

This application claims priority to and the benefit of U.S. Provisional Patent Application Ser. No. 61/014,950, by Galit, titled "Private Label Promotion Card System, Program Product, and Associated Methods" filed Dec. 19, 2007, incorporated herein by reference in its entirety. This application relates to U.S. patent application Ser. No. 12/338,540, by Galit, titled "Private Label Promotion Card System, Program Product, and Associated Computer-Implemented Methods" filed on the same day as this application, Dec. 18, 2008, incorporated herein by reference in its entirety.

Many modifications and other embodiments of the invention will come to the mind of those skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

That claimed is:

1. A computer associated with a bank to define a bank computer to manage a plurality of promotion cards, the computer comprising:

one or more processors;

an input and output unit in communication with the one or more processors and adapted to communicate with an open payment network and a plurality of second computers associated with a plurality of retailers to define a plurality of retailer computers; and non-transitory computer-readable medium encoded with computer program operable by the one or more processors, the computer program comprising a set of instructions that, when executed by the one or more processors, cause the one or more processors to perform the operations of:

issuing, by the one or more processors, a plurality of cards configured to be used only with one of the one or more retailers in association with one or more promotions to define a plurality of promotion cards, one or more of the plurality of retailers having an obligation to pay a predetermined discount amount to a bank for the plurality of promotion cards issued by the bank;

activating, by the one or more processors, one or more of the plurality of promotion cards to have a redemption value responsive to a receipt of an indication from one or more of a plurality of retail computers that one or more retail customers are eligible for the one or more promotions with one or more of the plurality of retailers, the bank having an obligation to fund from bank's funds one or more authorized transactions associated with the one or more of the plurality of promotion cards up to the redemption value, the predetermined discount amount being less than the redemption value;

authorizing, by the one or more processors, one or more transaction payment requests associated with one or more of the plurality of promotion cards activated by the one or more processors to define one or more authorized transactions, the authorizing being responsive to a value of the one or more transaction payment requests being less than the redemption value of the one or more of the plurality of promotion cards so that the one or more of the plurality of promotion cards have a remaining redemption value;

transferring, by the one or more processors, funds in an amount of the value of the one or more transaction payments request from the bank computer to the one or more of the plurality of retail computers via an open payment network so that the bank meets the obligation to fund the one or more authorized transactions;

receiving via the open payment network funds in a first amount from the one or more of the plurality of retail computers, the first amount being a value of the predetermined discounted amount of the one or more authorized transactions; and receiving via the open payment network funds in a second amount from the one or more of the plurality of retail computers responsive to expiration of the one or more of the plurality of promotion card, the second amount being a value of the predetermined discount amount of the remaining redemption value upon expiration.

2. A bank computer as defined in claim 1, wherein the one or more promotion is a coupon for one or more purchases with the one of the plurality of retailers so that the one or more of the plurality of activated promotion cards are coupon-type cards.

3. A bank computer as defined in claim 1, wherein the one or more promotion is a rebate so that the one or more of the plurality of activated promotion cards are rebate-type cards.

4. A bank computer as defined in claim 1, wherein the activating is made via a proprietary network, and wherein the authorizing is made via the open payment network.

5. A bank computer as defined in claim 1, wherein the funds being received from the one or more of the plurality of retail computers are made via an Automated Clearing House (ACH) network, wherein the one or more purchase request is made by using a point of sale terminal; wherein the activating is made via a proprietary network, and wherein the authorizing is made via the open payment network.

6. A bank computer as defined in claim 1, wherein the bank is a federally-charted bank, and wherein the activating step is complete prior to delivery of the one or more of the plurality of promotion cards to the one or more retail customers.

7. A bank computer as defined in claim 1, wherein the one or more of the plurality of activated promotion cards is in variable denominations.

8. A bank computer as defined in claim 6, wherein the funds being received from the one or more of the plurality of retail computers are made via an Automated Clearing House (ACH) network, wherein the one or more purchase request is made by using a point of sale terminal; wherein the activating is made via a proprietary network; wherein the authorizing is made via the open payment network; and wherein the one or more of the plurality of activated promotion cards is in variable denominations.

9. Non-transitory computer-readable medium encoded with computer program operable by a computer associated with a bank to define a bank computer, the computer program comprising a set of instructions that, when executed by the bank computer, cause the bank computer to perform the operations of:

issuing, by a computer associated with a bank to define a bank computer, a plurality of cards configured to be used only with one or more of a plurality of retailers in association with one or more promotions to define a plurality of promotion cards, one or more of the plurality of retailers having an obligation to pay a predetermined discount amount to the bank for the plurality of promotion cards issued by the bank;

activating, by the bank computer, one or more of the plurality of promotion cards to have a redemption value responsive to a receipt of an indication from one or more of a plurality of retail computers that one or more retail customers are eligible for the one or more promotions with one or more of the plurality of retailers, the bank having an obligation to fund from bank's funds one or more authorized transactions associated with the one or more of the plurality of promotion cards up to the redemption value, the predetermined discount amount being less than the redemption value;

authorizing, by the bank computer, one or more transaction payment requests associated with one or more of the plurality of promotion cards activated by the bank computer to define one or more authorized transactions, the authorizing being responsive to a value of the one or more transaction payment requests being less than the redemption value of the one or more of the plurality of promotion cards so that the one or more of the plurality of promotion cards have a remaining redemption value;

transferring, by the bank computer, funds in an amount of the value of the one or more transaction payments request from the bank computer to the one or more of the plurality of retail computers via an open payment network so that the bank meets the obligation to fund the one or more authorized transactions;

receiving via an open payment network funds in a first amount from the one or more of the plurality of retail computers, the first amount being a value of the predetermined discounted amount of the one or more authorized transactions; and receiving via the open payment network funds in a second amount from the one or more of the plurality of retail computers responsive to expiration of the one or more of the plurality of promotion card, the second amount being a value of the predetermined discount amount of the remaining redemption value upon expiration.

10. Non-transitory memory as defined in claim 9, wherein the one or more promotion is a coupon for one or more purchases with the one of the plurality of retailers so that the one or more of the plurality of activated promotion cards are coupon-type cards.

11. Non-transitory memory as defined in claim 9, wherein the one or more promotion is a rebate so that the one or more of the plurality of activated promotion cards are rebate-type cards.

12. Non-transitory memory as defined in claim 9, wherein the activating is made via a proprietary network, and wherein the authorizing is made via the open payment network.

13. A computer-implemented method to manage a plurality of promotion cards, the method comprising:

issuing, by a computer associated with a bank to define a bank computer, a plurality of cards configured to be used only with one of a plurality of retailers in association with one or more promotions to define a plurality of promotion cards, one or more of the plurality of retailers having an obligation to pay a predetermined discount amount to the bank for the plurality of promotion cards issued by the bank;

activating, by the bank computer, one or more of the plurality of promotion cards to have a redemption value responsive to a receipt of an indication from one or more of a plurality of retail computers that one or more retail customers are eligible for the one or more promotions with one or more of the plurality of retailers, the bank having an obligation to fund from bank's funds one or more authorized transactions associated with the one or more of the plurality of promotion cards up to the redemption value, the predetermined discount amount being less than the redemption value;

authorizing, by the bank computer, one or more transaction payment requests associated with one or more of the plurality of promotion cards activated by the bank computer to define one or more authorized transactions, the authorizing being responsive to a value of the one or more transaction payment requests being less than the redemption value of the one or more of the plurality of promotion cards so that the one or more of the plurality of promotion cards have a remaining redemption value;

transferring, by the bank computer, funds in an amount of the value of the one or more transaction payments request from the bank computer to the one or more of the plurality of retail computers via an open payment network so that the bank meets the obligation to fund the one or more authorized transactions;

receiving via an open payment network funds in a first amount from the one or more of the plurality of retail computers, the first amount being a value of the predetermined discounted amount of the one or more authorized transactions; and receiving via the open payment network funds in a second amount from the one or more of the plurality of retail computers responsive to expiration of the one or more of the plurality of promotion card, the second amount being a value of the predetermined discount amount of the remaining redemption value upon expiration.

14. A computer-implemented method as defined in claim 13, wherein the one or more promotion is a coupon for one or more purchases with the one of the plurality of retailers so that the one or more of the plurality of activated promotion cards are coupon-type cards.

15. A computer-implemented method as defined in claim 13, wherein the one or more promotion is a rebate so that the one or more of the plurality of activated promotion cards are rebate-type cards.

16. A computer-implemented method as defined in claim 13, wherein the funds being received from the one or more of the plurality of retail computers are made via an Automated Clearing House (ACH) network, wherein the one or more purchase request is made by using a point of sale terminal; wherein the activating is made via a proprietary network; wherein the authorizing is made via the open payment network; and wherein the one or more of the plurality of activated promotion cards is in variable denominations.

17. A computer-implemented method as defined in claim 16, wherein the bank is a federally-charted bank, and wherein the activating step is complete prior to delivery of the one or more of the plurality of promotion cards to the one or more retail customers.

18. A computer-implemented method as defined in claim 13, wherein the funds received from the one or more of the plurality of retail computers are made via an Automated Clearing House (ACH) network, and wherein the one or more purchase request is made by using a point of sale terminal.

19. A computer-implemented method as defined in claim 13, wherein the one or more of the plurality of activated promotion cards is in variable denominations.

20. A computer-implemented method as defined in claim 13, wherein the activating is made via a proprietary network, and wherein the authorizing is made via the open payment network.

* * * * *

UNITED STATES PATENT AND TRADEMARK OFFICE
CERTIFICATE OF CORRECTION

| | | |
|---|---|---|
| PATENT NO. | : 8,306,912 B2 | Page 1 of 1 |
| APPLICATION NO. | : 12/338497 | |
| DATED | : November 6, 2012 | |
| INVENTOR(S) | : Scott H. Galit | |

It is certified that error appears in the above-identified patent and that said Letters Patent is hereby corrected as shown below:

On the title page, item (57), Abstract, Line 5, please replace "finds" with "funds"

Specification, Column 6, Line 5, please replace "find" with "fund"

Specification, Column 6, Line 14, please replace "banks" with "bank"

Specification, Column 7, Line 21-22, please replace "finding" with "funding"

Specification, Column 9, Line 16, please replace "finds" with "fund"

Specification, Column 10, Line 11, please replace "farther" with "further"

Specification, Column 10, Line 61, please replace "fiends" with "funds"

Signed and Sealed this
Fifth Day of February, 2013

Teresa Stanek Rea
*Acting Director of the United States Patent and Trademark Office*